US007146132B2

(12) United States Patent
Keller et al.

(10) Patent No.: US 7,146,132 B2
(45) Date of Patent: Dec. 5, 2006

(54) CELLULAR RADIO NETWORK REUSING FREQUENCIES

(75) Inventors: Ralf Keller, Würselen (DE); Ralf Tonjes, Herzogenrath (DE); Wolfgang Stahl, Eckenthal (DE); Jörn Thielecke, Erlangen (DE); Jörg Huschke, Nürnberg (DE); Udo Wachsmann, Schwabach (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 48 days.

(21) Appl. No.: 10/415,983
(22) PCT Filed: Jun. 26, 2001
(86) PCT No.: PCT/EP01/07264

§ 371 (c)(1),
(2), (4) Date: Oct. 15, 2003

(87) PCT Pub. No.: WO02/37881

PCT Pub. Date: May 10, 2002

(65) Prior Publication Data

US 2004/0092256 A1 May 13, 2004

(30) Foreign Application Priority Data

Nov. 6, 2000 (EP) .................................. 00124124

(51) Int. Cl.
*H04B 1/00* (2006.01)
*H04B 15/00* (2006.01)
(52) U.S. Cl. ..................... 455/63.1; 455/446; 455/447; 455/448
(58) Field of Classification Search ................ 455/443, 455/444, 447, 448, 450, 446, 449, 63.1, 423, 455/424, 425
See application file for complete search history.

(56) References Cited

U.S. PATENT DOCUMENTS 5,490,285 A * 2/1996 Ahlenius et al. ............ 455/446

(Continued)

FOREIGN PATENT DOCUMENTS

WO    99/57931 A    11/1999

(Continued)

OTHER PUBLICATIONS

Yamaguchi et al; "Proposal of Multi Layered Microcell System with No Handover Areas"; IEICE Transactions on Communications, Institute of Electronics Information and Comm. ENG. Tokyo, JP, vol. E79-B, No. 3, Mar. 1, 1996, pp. 266-271, XP000588449.

(Continued)

*Primary Examiner*—Matthew Anderson
*Assistant Examiner*—Tuan Pham
(74) *Attorney, Agent, or Firm*—Nixon & Vanderhye P.C.

(57) ABSTRACT

Method of arranging a cellular radio network in a geographical area which is already covered by an existing cellular radio network, wherein cell clusters of the cellular radio network to be introduced and using a specific transmission frequency are located in areas determined by connecting at least two cells of the existing cellular radio network using the specific transmission frequency, and wherein the cell clusters are arranged such that they do not overlap with the cells of the existing cellular radio network. The cell clusters of the introduced cellular radio network may be adjusted by reducing the cell size of cell clusters of the introduced cellular radio network, and by introducing new cells into cell clusters of the introduced cellular radio network. The invention allows to reuse frequencies of an existing cellular radio network by an introduced cellular radio network in the same geographical area.

25 Claims, 13 Drawing Sheets

U.S. PATENT DOCUMENTS

| | | | |
|---|---|---|---|
| 5,946,624 A * | 8/1999 | Petranovich et al. | 455/447 |
| 5,999,818 A * | 12/1999 | Gilbert et al. | 455/448 |
| 6,085,092 A * | 7/2000 | Schmidt et al. | 455/447 |
| 6,094,584 A * | 7/2000 | Khanna et al. | 455/512 |
| 2001/0046866 A1 * | 11/2001 | Wang | 455/447 |
| 2002/0042276 A1 * | 4/2002 | Hakalin et al. | 455/453 |

FOREIGN PATENT DOCUMENTS

| | | |
|---|---|---|
| WO | WO 99/57931 | 11/1999 |

OTHER PUBLICATIONS

Yamaguchi et al XP000588449 IEICE Transactions on Communications, Institute of Electronics Information and Comm. Eng. vol. E79-B, No. 3, Mar. 1996, pp. 266-271 "Proposal of Multi Layered Microcell System with no Handover Areas".

Shin et al., IEEE TENCON 1999; Power Control and QoS of a CDMA based Hierarchical Cell Structure Network, pp. 1220-1223.

International Search Report PCT EP 01/07264.

\* cited by examiner

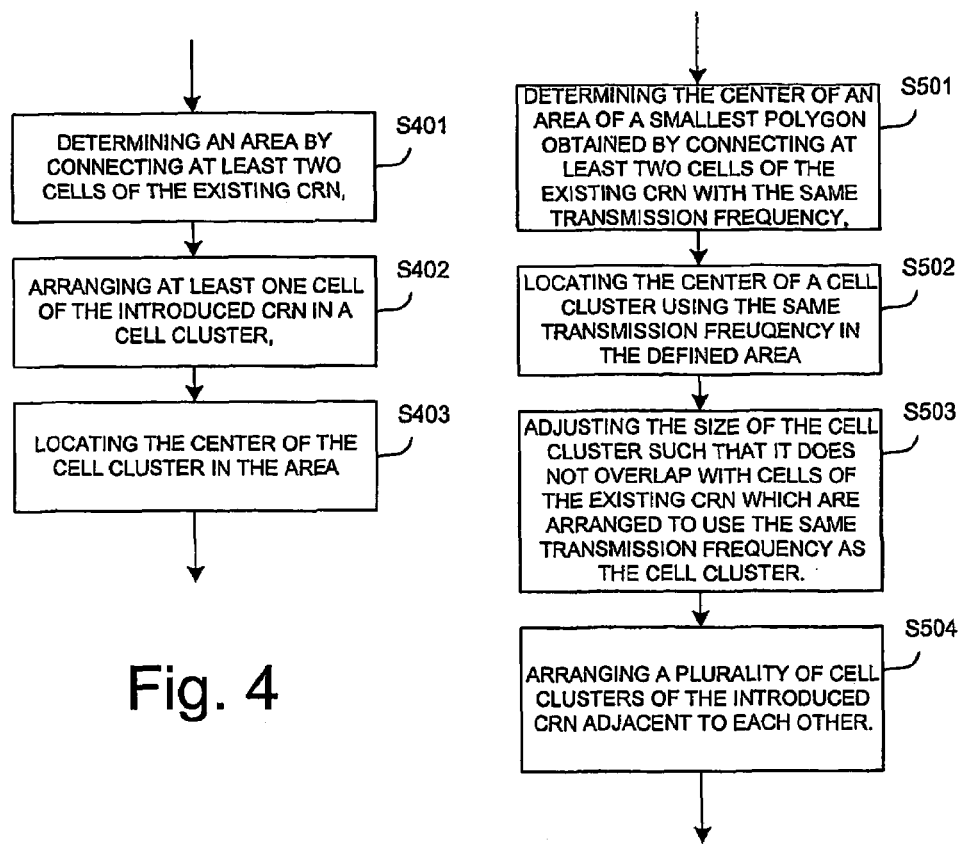
Fig. 4
Fig. 5
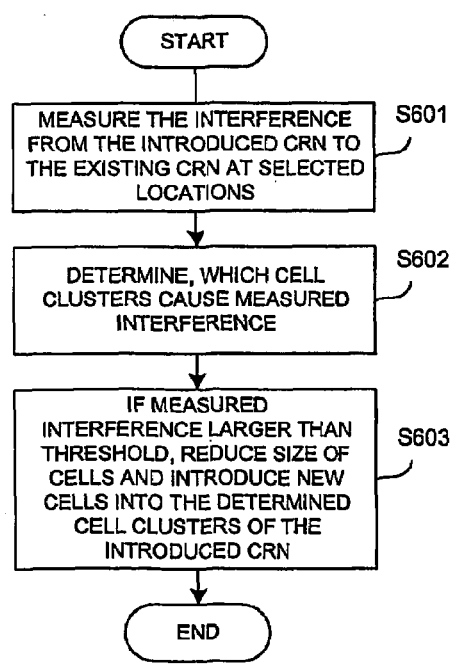
Fig. 6

CELLULAR RADIO NETWORK REUSING FREQUENCIES

The invention relates to a cellular radio network and to a method of arranging a cellular radio network in a geographical area.

TECHNOLOGICAL BACKGROUND OF THE INVENTION

Cellular radio networks are increasingly used to provide a variety of communication and information services to users. In many cases communication networks coexist with each other in a given geographical area and simultaneously provide services to subscribers.

A cellular radio network generally uses a certain partition of the available spectrum for providing services. However, as the available spectrum is limited, the usage of the spectrum is normally subject to regulation and each communication network will have a certain partition of the spectrum allocated for usage. In this case it needs to be assured that the coexisting cellular radio networks, or in general any radio networks, do not interfere with each other above a certain tolerable level.

One straightforward approach to avoid interference between cellular radio networks is to exclusively allocate a certain partition of the spectrum in one geographical area. Each cellular radio network may then provide communication services in the allocated partition of the spectrum. Interference may be further reduced by guard bands introduced between the allocated partitions of the spectrum.

A frequency range allocated to a cellular radio network may be a continuous range of frequencies, or certain partitions of the spectrum may be combined to a frequency range for one cellular radio network. Therefore, a frequency range of a cellular radio network may include a single sequence of frequencies or multiple discontinuous sequences of frequencies, or a set of individual frequencies.

While this approach may work well up to a certain number of subscribers or up to a certain number of networks, in case the number of networks or subscribers needs to be further increased, the available spectrum may not suffice for introducing new cellular radio networks or providing services to further subscribers.

In this case it is desirable to be able to introduce a further cellular radio network in an geographical area already covered by at least one cellular radio network, wherein the introduced cellular radio network may reuse frequencies already used in the existing cellular radio network.

SUMMARY OF THE INVENTION

It is therefore the object of the invention to provide a cellular radio network in a geographical area covered by another cellular radio network, wherein both cellular radio networks can provide communication services in at least overlapping frequency ranges. Further, it is object of the invention to reduce interference occurring between the networks.

This object of the invention is solved by the features of claims 1, 16, 30 and 39.

A cellular radio network constituting an introduced cellular radio network and using a first frequency range, arranged in a geographical area served by an existing cellular radio network, the existing cellular radio network using a second frequency range at least overlapping the first frequency range, comprises a plurality of cell clusters, each cell cluster including at least one cell, the center of each cell cluster being located in a first area defined by connecting at least two cells of the existing cellular radio network, the at least two cells being arranged to use the same transmission frequency; and wherein both the cell cluster of the introduced cellular radio network and the at least two cells of the existing cellular radio network are arranged to use the same transmission frequency.

The invention allows an improved efficiency in using an available frequency spectrum in a geographical area served by multiple cellular radio networks. Further, an interference between networks using the same transmission frequencies in the same geographical area can be reduced and/or a larger number of subscribers may be served.

Advantageously, the center of each cell cluster may be located in the first area, the first area being constituted by smallest polygon defined by connecting at least two cells of the existing cellular radio network, and both the cell cluster of the introduced cellular radio network and the at least two cells of the existing cellular radio network may use the same transmission frequency.

The first area may be defined by the smallest triangle connecting the centers of three cells of the existing cellular radio network, the three cells using the same transmission frequency.

The at least two cells of the existing cellular radio network may use at least one further transmission frequency and the cell cluster of the introduced cellular radio network may use the at least one further transmission frequency.

Further, interference determining means may be provided for receiving a value indicating an interference from the introduced cellular radio network to the existing cellular radio network; and adjusting means may be provided for reducing the size of at least one cell of at least one cell cluster of the introduced cellular radio network and for introducing new cells into the at least one cell cluster, if the measured interference from the introduced cellular radio network to the existing cellular radio network is larger than a predetermined threshold.

Still further, interference determining means may be provided for receiving a value indicating an interference from the existing cellular radio network to the introduced cellular radio network; and the adjusting means may be arranged for at least one of—to increase a transmission power in the cells of the cell clusters, and—to reduce the size of at least one cell of at least one cell cluster of the introduced cellular radio network and to introduce new cells into the at least one cell cluster, if the measured interference from the existing cellular radio network to the introduced cellular radio network is larger than a predetermined threshold.

Cells at the periphery of the cluster may use at least one transmission frequency within the first frequency range and not within the second frequency range.

The cell clusters of the introduced cellular radio network may be arranged such that they do not overlap with cells of the existing cellular radio network which are using the same transmission frequency as the cell cluster.

Moreover, a first cluster may use a first set of transmission frequencies; a second cluster may be located adjacent to the first cluster may use a second set of transmission frequencies; and the cells at the periphery of the first cluster may be arranged to use at least one transmission frequency of the second set of transmission frequencies and the cells at the periphery of the second cluster may be arranged to use at least one transmission frequency of the first set of transmission frequencies and wherein adjacent cells use at least one identical transmission frequency.

An apparatus for adjusting cell parameters of cells of a plurality of cell clusters of a introduced cellular radio network using a first frequency range, each cell cluster including at least one cell, the introduced cellular radio network being arranged in a geographical area served by an existing cellular radio network, the existing cellular radio network using a second frequency range at least overlapping the first frequency range, comprises: interference determining means for receiving a value indicating an interference from the introduced cellular radio network to the existing cellular radio network; and adjusting means for adjusting the size of at least one cell of at least one cell cluster of the introduced cellular radio network and for adjusting the number of cells of the at least one cell cluster in dependence on the measured interference from the introduced cellular radio network to the existing cellular radio network.

Advantageously, the adjusting means may be adapted to reduce the size of at least one cell of at least one cell cluster of the introduced cellular radio network and to introduce at least one cell into the at least one cell cluster, in case the measured interference from the introduced cellular radio network to the existing cellular radio network is larger than a first predetermined threshold; and the adjusting means may be adapted to increase the size of at least one cell of at least one cell cluster of the introduced cellular radio network and for removing at least one cell from the at least one cell cluster, in case the measured interference from the introduced cellular radio network to the existing cellular radio network is smaller than a second predetermined threshold.

The interference determining means may be adapted to receive values indicating the interference from the introduced cellular radio network to the existing cellular radio network at a plurality of measurement locations, and the adjusting means may be adapted to determine at least one cell cluster causing the measured interference at each measurement location and to adjust the determined cell clusters in accordance with the measured interference.

A method of arranging a introduced cellular radio network using a first frequency range in a geographical area served by an existing cellular radio network, the existing cellular radio network using a second frequency range at least overlapping the first frequency range, comprises arranging at least one cell of the introduced cellular radio network in a cell cluster; determining a first area defined by connecting at least two cells of the existing cellular radio network, the at least two cells being arranged to use the same transmission frequency; arranging the cell cluster in the determined area; wherein both the cell cluster of the introduced cellular radio network and the at least two cells of the existing cellular radio network are arranged to use the same transmission frequency.

Another method of adjusting cell parameters of cells of a plurality of cell clusters of a introduced cellular radio network using a first frequency range, each cell cluster including at least one cell, the introduced cellular radio network being arranged in a geographical area served by an existing cellular radio network, the existing cellular radio network using a second frequency range at least overlapping the first frequency range, comprises: receiving a value indicating an interference from the introduced cellular radio network to the existing cellular radio network; and adjusting the size of at least one cell of at least one cell cluster of the introduced cellular radio network and adjusting the number of cells of the at least one cell cluster depending on the measured interference from the introduced cellular radio network to the existing cellular radio network.

The invention may employ the fact that a cellular radio network servicing a given geographical area does not use the allocated spectrum to its full potential at each and every location in the given geographical area. The cells of the cellular radio network to be introduced into a geographical area already served by an existing cellular radio network may advantageously be located such that the frequencies used by the introduced cellular radio network at a particular location are not used by the existing cellular radio network in overlapping cells at the same location.

Thus, the introduced cellular radio network may reuse frequencies of an existing cellular radio network in the same geographical area.

Further, the invention may advantageously allow to adjust the operational parameters of the introduced cellular radio network to avoid an interference from the introduced cellular radio network into the existing cellular radio network above a certain tolerable limit.

According to another example, an introduced or existing cellular radio network may be provided, wherein the transmission frequency used by both the cell cluster of the introduced cellular radio network and the at least two cells of the existing cellular radio network constitutes a first transmission frequency; a transmission frequency adjacent to the first transmission frequency constitutes a second transmission frequency; and a frequency plan used by the existing cellular radio network is adapted such that at least one cell of the existing cellular radio network using the second transmission frequency is located at or close to the center of a second area defined by connecting at least two cells of the existing cellular radio network using the first transmission frequency, the first and second area being different from each other.

According to another example, an introduced or existing cellular radio network may be provided, wherein the transmission frequency used by both the cell cluster of the introduced cellular radio network and the at least two cells of the existing cellular radio network constitutes a first transmission frequency; a transmission frequency adjacent to the first transmission frequency constitutes a second transmission frequency; and a frequency plan used by the existing cellular radio network is adapted such that at least one cell of the existing cellular radio network using the second transmission frequency is dislocated from the center of the first area.

According to another example, an introduced or existing cellular radio network may be provided, wherein the transmission frequency used by both the cell cluster of the introduced cellular radio network and the at least two cells of the existing cellular radio network constitutes a first transmission frequency; a transmission frequency adjacent to the first transmission frequency constitutes a second transmission frequency; and wherein the center of a cell cluster of the introduced cellular radio network using the first transmission frequency is dislocated from the center of the first area in a direction increasing the distance from the cell cluster to the cells of the existing cellular radio network using the second transmission frequency.

According to another example, a cellular radio network may be provided, wherein the transmission frequency used by both the cell cluster of the introduced cellular radio network and the at least two cells of the existing cellular radio network constitutes a first transmission frequency; a transmission frequency adjacent to the first transmission frequency constitutes a second transmission frequency; and wherein the center of a cell of the existing cellular radio network is located at the center of a cell of a cell cluster of the introduced cellular radio network using the second transmission frequency.

According to another example, a cellular radio network may be provided, wherein the transmission frequency used by both the cell cluster of the introduced cellular radio network and the at least two cells of the existing cellular radio network constitutes a first transmission frequency within a first frequency band; a transmission frequency adjacent to the first transmission frequency constitutes a second transmission frequency within a second frequency band; and the at least one of the first and second transmission frequency is offset from the center of the corresponding frequency band in a frequency direction away from the respective other one of the first and second transmission frequency.

According to another example, a cellular radio network may be provided, wherein the transmission frequency used by both the cell cluster of the introduced cellular radio network and the at least two cells of the existing cellular radio network constitutes a first transmission frequency band; an adjacent frequency band is provided, located adjacent to the first transmission frequency band, the adjacent frequency band including a plurality of second transmission frequencies; and wherein the cell clusters of the introduced cellular radio network and/or the at least two cells of the existing cellular radio network do not use at least one of the plurality of second transmission frequencies being located closest to the first transmission frequency band.

Further advantageous features of the invention are recited in further claims.

BRIEF DESCRIPTION OF THE FIGURES

FIG. 4 illustrates steps for locating cell clusters of the introduced cellular radio network according to an embodiment of the invention, FIG. 5 illustrates steps of the method according to another embodiment of the invention, FIG. 6 illustrates steps according to another embodiment of the invention for adjusting cell parameters of the introduced cellular radio network.

DETAILED DESCRIPTION OF THE PREFERRED EMBODIMENTS

Figure 1A:
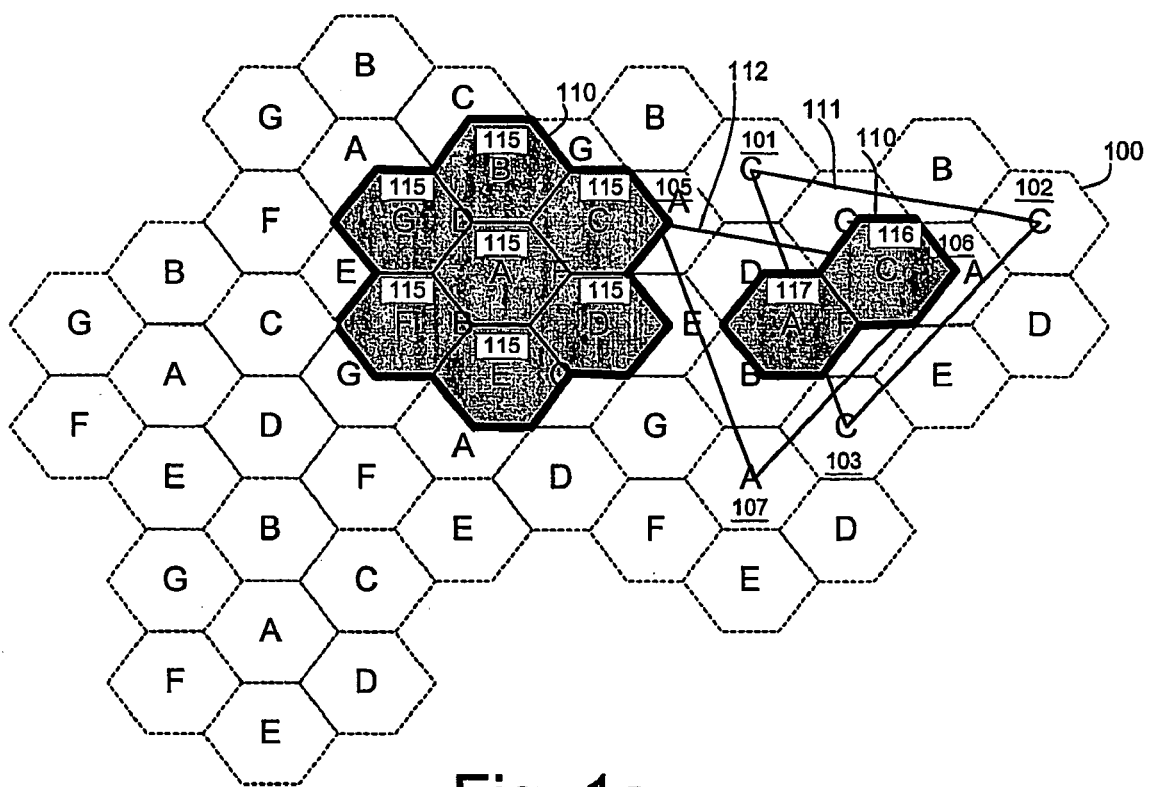
FIG. 1a schematically illustrates an introduced cellular radio network and steps for locating a cell cluster of the introduced cellular radio network according to a first embodiment of the invention, FIG. 1b schematically illustrates steps for locating a cell cluster of the introduced cellular radio network according to another embodiment of the invention, FIG. 1c schematically illustrates an area for locating a cell cluster of the introduced cellular radio network according to another embodiment of the invention.
Figure 1B:
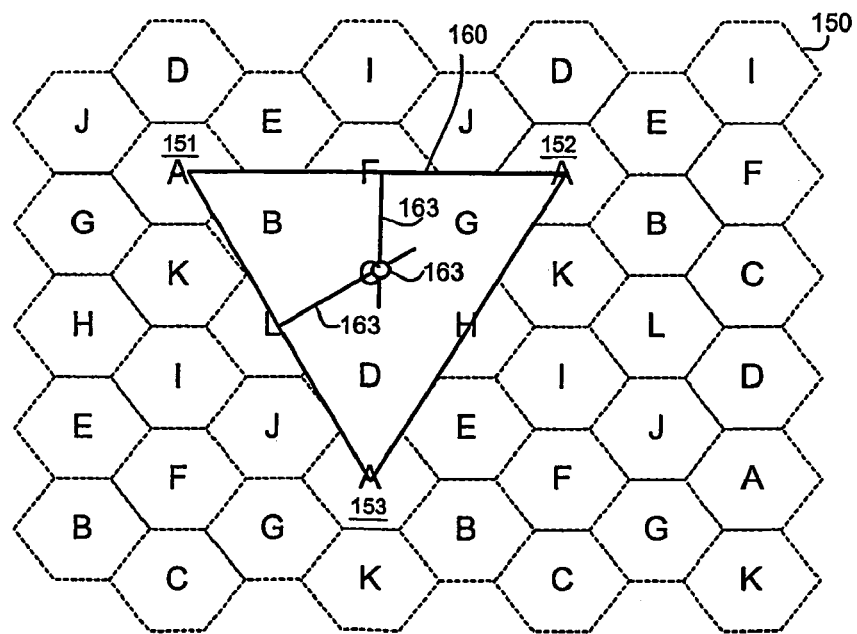
Figure 1C:
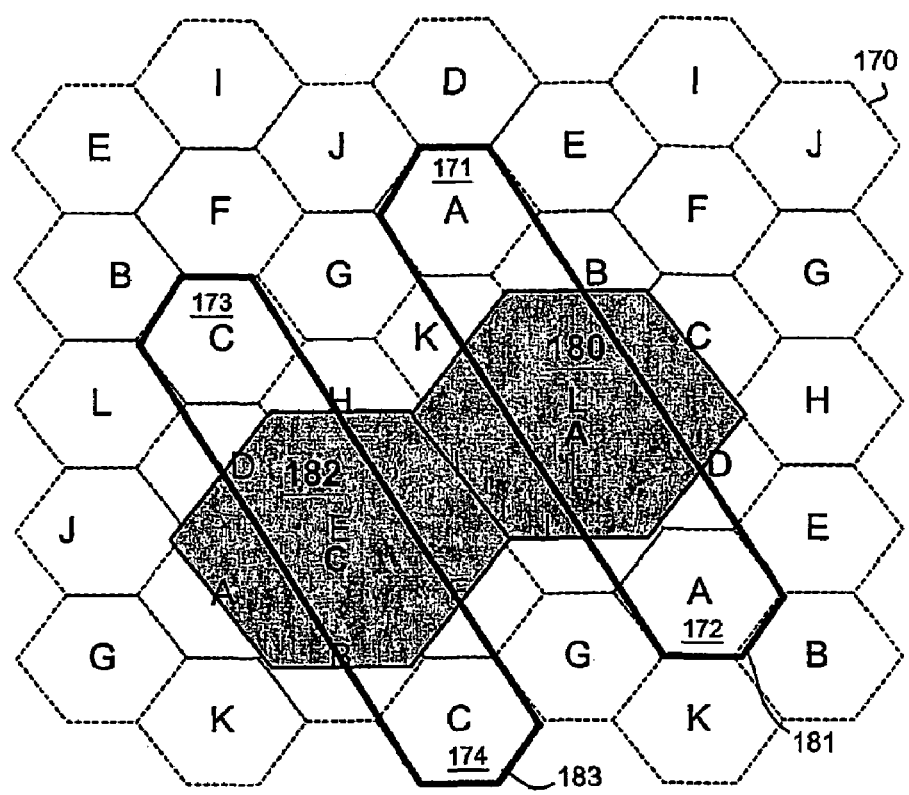

FIGS. 1a–c schematically illustrate elements of an existing cellular radio network (existing cellular radio network) and elements of an introduced cellular radio network (introduced cellular radio network) located in the same geographical area. Further, FIGS. 1a–c illustrate steps performed in locating cell clusters of the introduced cellular radio network into the geographical area.

FIG. 1a shows an existing cellular radio network 100 comprising a plurality of cells using transmission frequencies A–G of a frequency range allocated to the existing cellular radio network, e.g., according to a frequency plan as known in the art. In the shown embodiment, the existing cellular radio network thus has a frequency reuse factor of 7. In the embodiment the cells are shown as hexagons, however, any other representation of cells may be chosen, such as squares, circles, etc. Further, it is possible that each cell of the existing cellular radio network itself constitutes a cell cluster of cells, the cells of the respective cell clusters using the same transmission frequency.

Further, FIG. 1a shows exemplary portions of an introduced cellular radio network 110, which may be a network to be arranged or rearranged in the geographical area of the existing cellular network. The introduced cellular radio network includes seven exemplary cell clusters 115, each cell cluster in this embodiment consisting of a single cell. Each cell cluster of the introduced cellular radio network 110 uses one of the transmission frequencies A–G. Further, the introduced cellular radio network 110 includes a cell cluster 116 using a frequency C and a cell cluster 117 using a transmission frequency A.

Still further, FIG. 1a illustrates a triangle 111 for locating the cell cluster 116 and a triangle 112 for locating the cell cluster 117 of the introduced cellular radio network 110.

The triangle 111 has corner points at cells 101, 102 and 103 of the existing cellular radio network 100, each of the cells 101–103 using a transmission frequency C. The triangle 112 has corner points at cells 105, 106 and 107 of the existing cellular radio network 100, each of the cells 105–107 using a transmission frequency A.

The corner point of the triangles may be located in the center of the cells of the existing cellular radio network 100 or at any other location inside the cells of the existing cellular radio network 100.

The introduced cellular radio network 110 preferably uses a first frequency range, as exemplary shown in FIG. 1a a frequency range A–G, and is arranged in a geographical area served by the existing cellular radio network 100, wherein the existing cellular radio network preferably has a frequency reuse factor larger than 1 and uses a second frequency range, as exemplary shown in FIG. 1a a frequency range A–G. However, the frequency ranges do not necessarily coincide, they may also only overlap or influence each other.

Further, the introduced cellular radio network 110 includes a plurality of cell clusters, each of the cell clusters including at least one cell. In the shown embodiment each cell cluster includes one cell. The center of each cell cluster is preferably located in an area defined by connecting at least two cells of the existing cellular radio network 100. In the present case, the area is constituted by the triangles 111 and 112, obtained by connecting three cells of the existing cellular radio network 100. However, it is possible that any other polygon may be used to define the area. The at least two cells of the existing cellular radio network 100 use the same transmission frequency, in the present case transmission frequency A, and the cell cluster of the introduced cellular radio network 110, to be located in the defined area, also uses the transmission frequency A. Thus, both a cell cluster of the introduced cellular radio network 110 and the at least two cells of the existing cellular radio network 100 used for defining the area, are using the same transmission frequency.

As it can be seen in FIG. 1a, the existing cellular network 100 servicing the shown may not fully use the allocated spectrum of transmission frequencies A–G at each location in the shown area and the cell clusters of the introduced cellular radio network 110 may be advantageously located such that the frequencies used by cell clusters of the introduced cellular radio network at a particular location are not used by the existing cellular radio network in cells at this location.

In the following, the elements shown in FIG. 1a are outlined in further detail.

The existing cellular radio network 100 may in general be any cellular radio network having a cell structure for covering a given geographical area. For example, the existing cellular radio network 100 may be a GSM network, a wideband CDMA network, a UTRAN network or broadcast network, e.g. a network for television broadcast, video on demand or similar such as DVB-T or similar. The existing cellular radio network 100 may generally have any frequency reuse factor larger than one, i.e. may reuse frequencies of an allocated set of frequencies according to any given scheme. In the shown embodiment the existing cellular radio network 100 uses transmission frequencies A–G, i.e. seven frequencies, and therefore is defined to have a frequency reuse factor of 7. However, it is noted that any other frequency reuse factor including a frequency reuse factor is possible.

The transmission frequencies A–G used by the existing cellular radio network 100 and the introduced cellular radio network may be single frequencies, however, in practical cases, each of the transmission frequencies A–G may include a set of transmission frequencies or ranges of transmission frequencies.

Thus, in the present application, the term transmission frequency is to be understood as including one or more frequencies. For example, a transmission frequency may include a single carrier frequency and, if modulated with the transmission signal, cover a frequency range. Further, even though FIG. 1a only shows a single layer of cells of the existing cellular radio network 100, the existing cellular radio network 100 may employ multiple layers of cells, e.g. layers of macro cells and layers of micro cells.

Still further, the person skilled in the art understands that same transmission frequency is not to be construed as limited to mathematically identical frequencies, rather, the expression "same" transmission frequencies may also include frequencies which are mathematically different but influence each other, e.g. interfere. This may also include a transmission frequency which comprises frequency components which are integer multiples of the components of the another transmission frequency.

If transmission frequencies each include multiple frequencies or ranges of frequencies, e.g. radio channels, they may be considered to constitute "same" transmission frequencies, in case frequencies of, e.g. radio channels coincide.

The introduced cellular radio network 110 may be any communication network, for example, a GSM network, a wideband CDMA network, a UTRAN network or broadcast network, e.g. a network for television broadcast, video on demand or similar such as DVB-T or similar. The illustrated exemplary introduced cellular radio network 110 includes a plurality of cell clusters 115, 116 and 117, each cell cluster using one of transmission frequencies A–G. Nevertheless, it is possible that the introduced cellular radio network 110 uses a sub-set of the transmission frequencies A–G or additional transmission frequencies, thus, the introduced cellular radio network 110 may use for example transmission frequencies A, B, C, H, K, L. According to the invention, the frequency ranges of the existing cellular radio network and the introduced cellular radio network may only overlap, i.e., that at least some frequencies are used by both the existing cellular radio network and the introduced cellular radio network.

In the shown embodiment each cell cluster 115, 116, 117 of the introduced cellular radio network 110 includes one cell, however, a cell cluster may also include a plurality of cells. A cell cluster 115, 116, 117 of the introduced cellular radio network may have a frequency reuse factor of 1 or above. For example, in case each cell cluster has a plurality of cells and the frequency reuse factor is 1, each cell of the cell cluster will use the same transmission frequency.

The cell clusters 115, 116 and 117 of the introduced cellular radio network 110 may be located in the same geographical area as the cells of the existing cellular radio network 100, however, at locations where the existing cellular radio network does not use the transmission frequency of a cluster of the introduced cellular radio network. A cell cluster of the introduced cellular radio network is preferably located in an area defined by connecting at least two cells of the existing cellular radio network 100 using the same transmission frequency, while the thus defined area preferably does not include any further cells of the existing cellular radio network 100 using the same transmission frequency as the transmission frequency of the cells used for defining the area. The cell cluster of the introduced cellular radio network located in the defined area also uses the same transmission frequency, i.e., the transmission frequency of the cells of the existing cellular radio network used for defining the area.

In the example of FIG. 1a, a triangle 111 defines an area for an exemplary cell cluster 116 of the introduced cellular radio network 110, the cell cluster 116 using the transmission frequency C. The triangle 111 is obtained by connecting three cells of the existing cellular radio network using the transmission frequency C, in the shown case the three cells 101, 102 and 103 of the existing cellular radio network. The cell cluster 116 is located inside the thus defined area, i.e. triangle 111, and, as it may be taken from FIG. 1a the cell cluster 116 is now located in a geographical area at which the existing cellular radio network does not directly use transmission frequency C.

In general the cell cluster 116 of the introduced cellular radio network may be located anywhere inside the area 111, however, it may be preferred that the cell cluster 116 is arranged inside the area 111 such that the cell cluster 116 using transmission frequency C does not overlap with cells of the existing cellular radio network 100 at the corner points of the triangle, i.e. cells 101, 102 and 103, also using transmission frequency C.

Similarly, a triangle 112 defines an area for an exemplary cell cluster 117 of the introduced cellular radio network 110, the cell cluster 117 using the transmission frequency A and lying adjacent to cell cluster 116. The triangle 112 is obtained by connecting three cells of the existing cellular radio network using the transmission frequency A, in the shown case the three cells 105, 106 and 107. The cell cluster 117 is located inside the thus defined area.

Even though in the present embodiment the adjacent cell clusters 116 and 117 have the same size, different sizes for the clusters are possible, e.g. one of the clusters could have a larger radius, e.g. due to system requirements, terrain characteristics, subscriber density, interference conditions between the introduced cellular radio network and the existing cellular radio network and similar.

Similar to the cell clusters 116 and 117, the cell clusters 115 and further cell clusters may be arranged according to the outlined rules, in order to obtain a full coverage of a given geographical area.

Further, even though in the embodiment described with respect to FIG. 1a the area 111 for locating the cell cluster 116 is a triangle, in general any polygon or shape such as a circle or ellipsoid may be employed. Preferably, the polygon or shape may be a polygon having a given number of corners defined by connecting cells of the existing cellular radio network using the same transmission frequency, e.g. transmission frequency A, preferably to avoid that cells of the existing cellular radio network using the transmission frequency of the cells used for defining the polygon, are located inside the thus defined area. The polygon may be the smallest thus defined polygon of a given number of cells.

The smallest polygon may be the polygon with the smallest area connecting any given number of cells using the same transmission frequency.

Even though in FIG. 1a the existing cellular radio network 110 has a frequency reuse factor of 7, theoretically any other frequency reuse factor is possible, for example frequency reuse factors 3, 4, 9, 12 and similar.

As shown in FIG. 1a, in providing the cell clusters of the introduced cellular radio network at the defined locations, the introduced cellular radio network 110 and the existing cellular radio network 100 may coexist in a given geographical area while using the same transmission frequencies. Since the cell clusters of the introduced cellular radio network and the cells of the existing cellular radio network, each using the same transmission frequency, are at least not overlapping or have some guard space therebetween, particularly an interference from the introduced cellular radio network to the existing cellular radio network may be kept advantageously low. However, also an interference from the existing to the introduced cellular radio network may be kept advantageously low.

As an example, the existing cellular radio network may be a broadcast network, and the introduced cellular radio network may be a network for bi-directional communication, such as a GSM network, CDMA network. However, any other combination is possible.

In the following, a further embodiment of the invention will be described with respect to FIG. 1b, showing an example of locating a cell cluster of the introduced cellular radio network.

FIG. 1b illustrates an existing cellular radio network 150, the cells of which using frequencies A–L, i.e. the existing cellular radio network 150 has a frequency reuse factor of 12. The existing cellular radio network 150 may be any cellular radio network for bi-directional or uni-directional communication such as a GSM network, UMTS, broadcast network for video on demand and similar, as outlined before with respect to FIG. 1a. The existing cellular radio network 150 of the present example has a frequency reuse factor of 12, however, this is an example only, any other frequency reuse factor may be present.

Further, FIG. 1b shows a triangle 160 for locating a cell cluster of the introduced cellular radio network using transmission frequency A. The corners of the triangle 160 are located in the centers of cells 151, 152 and 153 of the existing cellular radio network 150, the cells using a transmission frequency A.

In the embodiment of FIG. 1b an example is shown wherein the area is defined by the smallest triangle connecting the centers of 3 cells of the existing cellular radio network, wherein the cells of the existing cellular radio network are arranged to use the same transmission frequency. It is noted, that any other smallest polygon or shape may be defined connecting at least two cells of the existing cellular radio network arranged to use the same transmission frequency, such that no cell of the existing cellular radio network using this transmission frequency is located inside the polygon or shape.

Since in the present example the cells of the existing cellular radio network 150 are arranged regularly, in the shown example the triangle is an equilateral triangle. In practical scenarios, however, the obtained triangle may not necessarily be equilateral, e.g., due to terrain characteristics, subscriber density and similar.

Further, in the shown embodiment of FIG. 1b it may be preferred that a cell cluster of the introduced cellular radio network is located in the defined area. Further, it may also be preferred that the center of the cell cluster of the introduced cellular radio network is located at the center of the defined area, i.e. in the present embodiment located at the center 163 of the triangle 160, such that the distance between the cells of the existing cellular radio network used for obtaining the area and the cell cluster is as large as possible. Thus, the distance between cells and cell clusters using the same transmission frequency may be advantageously large, in the present case between cells 151, 152 and 153 using the transmission frequency A and a cell cluster using the transmission frequency A located at the center 163. In this case an interference between the introduced cellular radio network and the existing cellular radio network may be kept low.

In case the triangle 160 is an equilateral triangle as in the present case, the center 163 may be obtained by determining the intersection of lines 161 and 162, the lines 161 and 162 being lines vertical to the corresponding sides of the triangle 160, intersecting the corresponding sides of the triangle 160 at their midpoint. However, it is also possible that instead a center of gravity or any other location inside the triangle 160 is determined, e.g. allowing reduced interference between the existing and introduced cellular radio network.

Even though the location of a single cell cluster of the introduced cellular radio network having transmission frequency A is illustrated, any other cell cluster of the introduced cellular radio network may be located at similar locations, determined by triangles connecting three cells of the existing cellular radio network using the same transmission frequency, e.g. three cells using transmission frequency B, three cells using transmission frequency C, etc.

Even though the existing cellular radio network 150 and the introduced cellular radio network 110 may use the same set of transmission frequencies, it is also possible that only some frequencies are at the same time used by the existing cellular radio network and the introduced cellular radio network. It is further possible that the cells of the existing cellular radio network, used for determining the corner points of the triangle 160 are using at least one further transmission frequency and the cell cluster of the introduced cellular radio network, i.e. the cell cluster located at the center 163 also uses the at least one further transmission frequency. As already outlined with respect to the embodiment of FIG. 1a, locating cell clusters as outlined above may keep an interference advantageously low.

In the following, a further embodiment of the invention will be described with respect to FIG. 1c. FIG. 1c shows a further example of areas defined for locating cell clusters of the introduced cellular radio network.

FIG. 1c shows an exemplary existing cellular radio network 170 having a frequency reuse factor of 12 and using transmission frequencies A–L. The existing cellular radio network may be a cellular radio network as outlined with respect to the previous embodiments.

Further, FIG. 1c shows an area 181 determined by connecting two cells 171 and 172 using a transmission frequency A of the existing cellular radio network 170. Even though the area 181 could be drawn as a single line, e.g., a line connecting the centers of cells 171 and 172 of the existing cellular radio network 170, the area 181 is drawn having a certain width determined by the width of the cells 171 and 172 or similar. Further, FIG. 1c shows a similar area 183 determined by connecting two cells 173 and 174 using a transmission frequency C of the existing cellular radio network 170.

Still further, FIG. 1c shows a cell cluster 180 of the introduced cellular radio network, such as the cellular radio network 110 described with respect to FIG. 1a, the cell cluster using a transmission frequency A and the center of the cell cluster 180 being located in the area 181, and, FIG. 1c shows a cell cluster 182 using a transmission frequency C located in the area 183.

Thus, as in the previous embodiments, the cell cluster 180 is located in an area which is defined by connecting a plurality of cells of the existing cellular radio network, in the present case two cells 171 and 172 of the existing cellular radio network, wherein the cells of the existing cellular radio network used for defining the areas and the respective cell cluster of the introduced cellular radio network use the same transmission frequency, e.g. the cells 171 and 172 used for defining the area 181 and the cell cluster 180 use the same transmission frequency, in the present case transmission frequency A.

Even though the cell cluster 180 may be located generally anywhere within the area 181, it may be preferred that the cell cluster 180 is located in the middle of the area 181, such that the distance between the cell cluster 180 and the cells 171 and 172 of the existing cellular radio network are identical, in order to achieve improved performance, i.e. reduced interference. The same applies to cell cluster 182.

The size of the cell clusters may be chosen such that a seamless coverage is possible, as in the present case. Since the size of the cell clusters in the present example is exemplarily shown larger than the size of the cells of the existing cellular radio network, a sub-set of the transmission frequencies A–L of the existing cellular radio network will suffice in this case for establishing the introduced cellular radio network.

Even though only two cell clusters 181 and 183 of the introduced cellular radio network are illustrated, it is understood that all cell clusters of the introduced cellular radio network may be similarly located, e.g. in the area of the smallest polygon defined by connecting at least two cells of the existing cellular radio network, using the same transmission frequency. According to the invention, the introduced cellular radio network may provide full geographical coverage, as the cell clusters may be arranged contiguously with one another.

In the following, a further embodiment of the invention will be described with respect to FIG. 2.

Figure 2:
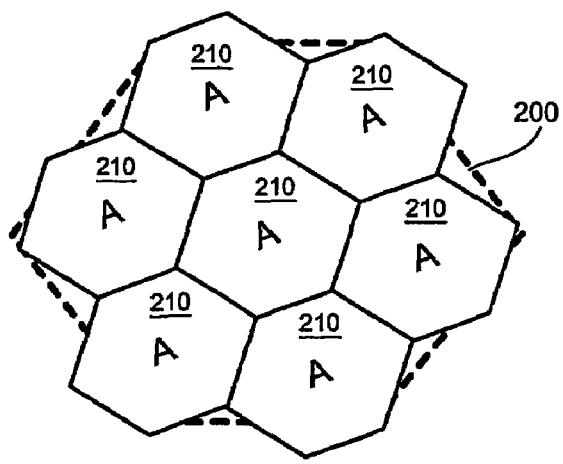
FIG. 2 illustrates a cell cluster of the introduced cellular radio network according to an embodiment of the invention.

FIG. 2 shows an example of a cell cluster 200 of an introduced cellular radio network, e.g. the introduced cellular radio network 110 described with respect to the embodiment of FIG. 1a. The cell cluster 200 of FIG. 2 is assumed to include seven cells with reference numeral 210 using a transmission frequency A, i.e., the cell cluster 200 of FIG. 2 is assumed to have a frequency reuse factor of 1.

Even though the cell cluster 200 is shown to include seven cells 210, any other number of cells is possible and may also be altered during operation of the network.

Even though not illustrated, at least one of the cells 210 of the cell cluster 200 may itself be constituted by cell clusters.

The size of the cell cluster 200 may preferably be chosen such that cell clusters of an introduced cellular radio network are arranged contiguously with each other and thus cover a given geographical area without gaps. Further, the size of the cells of the cell cluster may be different, e.g. larger cells may be placed into the center of the cell cluster.

The number of cells of the introduced cellular radio network may be varied in accordance with an interference of the introduced cellular radio network with the existing cellular radio network, i.e. an interference introduced in the existing cellular radio network through the operation of the introduced cellular radio network. Since the transmission power required in a cellular radio network among other factors depends on the size of a cell, a transmission power can be reduced by reducing the cell size of the cell cluster 200 of the introduced cellular radio network. Thus, if for example an interference measured at a given location in the existing cellular radio network is high, caused by the introduced cellular radio network, the cell size of the cells of a cluster of the introduced cellular radio network may be reduced, and, in order to still fully cover a given geographical area, new cells may be included into the cell clusters.

Further, in case the measured interference of the introduced cellular radio network to the existing cellular radio network is lowered, the process may be reverted and the cell size of the cells of the cell clusters may be increased.

The size of the cell cluster 200 may be chosen such that a contiguous area may be covered by the introduced cellular radio network, however, the size of the cell clusters of the introduced cellular radio network at different locations may vary according to circumstances, e.g. terrain characteristics, subscriber density and similar. It may be preferred that the cell size of the introduced cellular radio network is limited such that the cell clusters do not overlap with cells of the existing cellular radio network using the same transmission frequency as the cell cluster.

Even though the cell cluster illustrated in FIG. 2 is shown to have a frequency reuse factor of 1, any other frequency reuse factor may be used. However, it should be ensured that a frequency of the introduced cellular radio network is not already used by the existing cellular radio network at the same location.

Moreover, cells at the periphery of the cluster may use a transmission frequency within the frequency range assigned to the introduced cellular radio network and not within the frequency range of the existing cellular radio network, in order to further reduce the interference between the networks.

Further, the size of a cell cluster of the introduced cellular radio network may be equal to the average size of the cells of the existing cellular radio network used for obtaining the area for locating the cell cluster.

Finally, cell size of a cell at the periphery of a cluster of the introduced cellular radio network may be smaller than the cell size of a cell at the center of the cell cluster.

Figure 3:
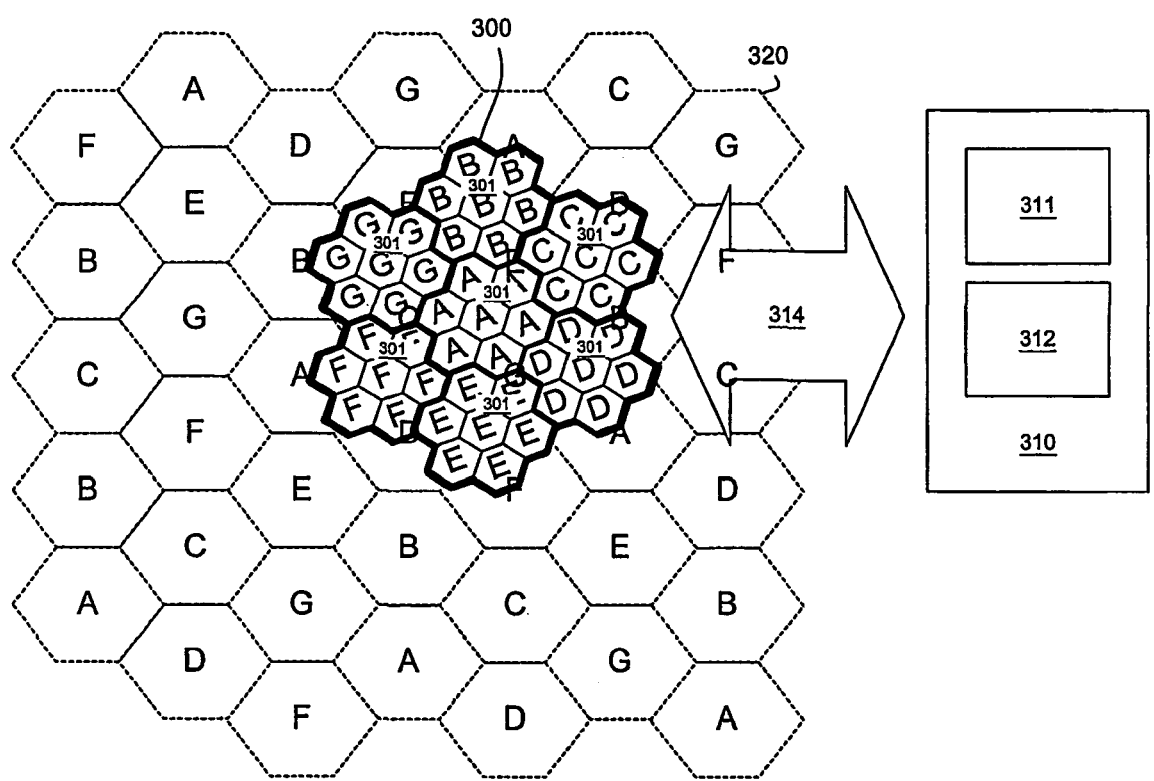
FIG. 3 illustrates an apparatus for locating cell clusters of the introduced cellular radio network in the same geographical area of an existing cellular radio network according to an embodiment of the invention.

In the following a further embodiment of the invention will be described with respect to FIG. 3. FIG. 3 partially shows an example of an introduced cellular radio network 300, e.g. as outlined before. The introduced cellular radio network includes a plurality of cell clusters 301, each using at least one of the transmission frequencies A–G and having a plurality of cells. The cell clusters may be arranged as described with respect to the previous embodiments.

An existing cellular radio network, e.g. as outlined with respect to previous embodiments, is denoted with reference numeral 320, and coexists with the introduced cellular radio network in the same geographical area.

FIG. 3 further shows control means 310 for dynamically adjusting characteristics of the introduced cellular radio network. The control means 310 includes interference measuring means 311 and adjusting means 312 for adjusting cell clusters. An arrow 314 illustrates control information exchanged between the cellular radio networks and the control means 310.

The introduced cellular radio network 300 is illustrated with seven cell clusters 301, each cell cluster being constituted by seven cells. Each of the shown cell clusters uses one of the frequencies A–G. Further, the frequencies A–G are also used by the existing cellular radio network 320. However, this is an example only, any other scenario is possible, as outlined before.

The exemplary cell clusters of the introduced cellular radio network 300 have a frequency reuse factor of 1, indicating that the cells of each cell cluster use the same transmission frequency. However, as outlined with respect to previous embodiments, it is also possible that frequency reuse factors larger than 1 may be employed for cell clusters of the introduced cellular radio network. The cell clusters of the introduced cellular radio network may be arranged as it was outlined with respect to previous embodiments, i.e., each cell cluster is located in an area defined by connecting at least two cells of the existing cellular radio network 320, wherein the at least two cells of the existing cellular radio network are arranged to use the same transmission frequency, which is the transmission frequency also used by the cell cluster arranged in the thus defined area.

The control means 310 is provided for dynamically adjusting parameters of the introduced cellular radio network, in order to maintain a proper coexistence between the existing cellular radio network and the introduced cellular radio network. The control means is arranged to adjust parameters of the introduced cellular radio network in order to maintain an interference from the introduced cellular radio network into the existing cellular radio network below a certain acceptable level. The acceptable level may be defined by the operator of the existing cellular radio network or may be a limit self-imposed by the operator of the introduced cellular radio network or may be a limit imposed by regulating authorities.

If for example an interference from the introduced cellular radio network in the existing cellular radio network, i.e. an interference measured in the existing cellular radio network, caused by the introduced cellular radio network, is above the acceptable limit, the parameters of the introduced cellular radio network may be adjusted such that the interference is reduced below the acceptable level. Likewise, in case the interference measured in the existing cellular radio network is decreased, the parameters of the introduced cellular radio network may be adapted, as explained below, such that interference is increased but does not exceed the acceptable limit.

It may be preferred that an interference in the existing cellular radio network, caused by the introduced cellular radio network, is measured at a plurality of locations, and that the parameters of the introduced cellular radio network are locally adapted to the measured interference level, i.e., the introduced cellular radio network may be locally adapted to interference conditions.

For example, an interference could be measured at statistically representative positions in the existing cellular radio network, for example located at base stations or mobile stations, determined according to subscriber density, terrain characteristics and similar. Thus, the interference may be measured on the downlink transmission path and on the uplink transmission path.

The control means 310 may be constituted by a data processing unit or a plurality of data processing units communicating via a network or via dedicated communication links.

The control means 310 includes the interference measuring means 311, at least for measuring the interference in the existing cellular radio network caused by the introduced cellular radio network. It is also possible that the control means only includes means for receiving values indicating an interference caused by the introduced cellular radio network. These interference measurements may for example be provided by the operator of the existing cellular radio network, e.g. using base stations and measurements on communication links.

The control means 310 further includes means for adjusting the parameters of the introduced cellular radio network, e.g., for adjusting parameters of the cell clusters of the introduced cellular radio network. The cell parameters to be adjusted may be at least one of:
 the number of cells included in a cell cluster,
 the cell size of a cell of a cell cluster, a maximum number of subscribers, and
the transmission power used for transmissions in a cell of a cell cluster of the introduced cellular radio network,
and similar.

The transmission power in a cell of a cell cluster of the introduced cellular radio network may depend on terrain characteristics, a number of subscribers, and similar. Further, it may be preferred that the adjusting means 312 for adjusting cell clusters is adapted to locally adjust the parameters of the cell clusters of the introduced cellular radio network in accordance with the interference measurements obtained. Thus, the adjusting means may be used to locally adjust the characteristics of the introduced cellular radio network. Thus, the adjusting means may reduce the size of at least one cell of at least one cell cluster of the introduced cellular radio network and/or introduce new cells into the at least one cell cluster, in case the measured interference from the introduced cellular radio network to the existing cellular radio network or the interference from the existing cellular radio network to the introduced cellular radio network is larger than a predetermined threshold.

Still further, the adjusting means 312 for adjusting cell clusters may be arranged to determine cell clusters which are actually causing the measured interference at each measurement location and may be arranged to adjust the determined cell clusters in accordance with the measured interference, as outlined before. This may, for example, be achieved by determining the cell clusters in the neighborhood of the measurement location likely to cause interference. Further, by determining which transmission frequencies cause the interference, cell clusters causing interference may be identified.

For example, in case in a given local area the measured interference from the introduced cellular radio network to the existing cellular radio network is above a certain limit, the cell site density of at least one cell cluster in an area the interference measurement is representative for, could be adjusted accordingly. For example, a cell radius could be decreased and in order to maintain the size of the cell cluster or full geographical coverage, new cells could be introduced into a cell cluster.

Further, the size of a cell cluster could be reduced and/or further cell clusters could be introduced or neighboring cell clusters could be increased in size. Also, an allowed maximum number of subscribers in a cell cluster could be reduced, in order to reduce the transmission power in a cell cluster, or further frequencies of a frequency range allocated for the introduced cellular radio network could be introduced into cell clusters, e.g., by introducing cells using further transmission frequencies.

In a further embodiment of the invention the interference measuring means may further include means for measuring the interference from the existing cellular radio network to the introduced cellular radio network, e.g. at statistically representative locations, as outlined before. The interference measurements of an interference in the introduced cellular radio network caused by the existing cellular radio network may be used to further adapt the characteristics of the introduced cellular radio network. For example, in case the interference from the existing cellular radio network to the introduced cellular radio network is above a certain threshold, meaning that operations of the introduced cellular radio network are deteriorated, a transmit power in the introduced cellular radio network may be adjusted so that a desired distribution of carrier to interference ratios is achieved in the introduced-cellular radio network. Further, means may be provided for measuring a propagation attenuation from the positions of measurement of an interference from the existing cellular radio network to the introduced cellular radio network, e.g. to a serving base station of the introduced cellular radio network.

Further, it is possible that different thresholds are defined, e.g., an upper threshold for a maximum acceptable interference from the introduced cellular radio network to the existing cellular radio network is defined, and that a lower threshold for the interference from the introduced cellular radio network to the existing cellular radio network is defined. In case the interference measured is above the upper threshold, the parameters of the introduced cellular radio network may be adjusted such that the interference is below the upper threshold.

In order to avoid a continuous control operation, the parameters of the introduced cellular radio network are only adjusted, if the measured interference decreases below the lower threshold, in which case the parameters of the introduced cellular radio network are adjusted such that the interference slightly rises. The thus introduced hysteresis avoids a permanent control operation, control operations may only be performed, if the measured interference is above the upper threshold or below the lower threshold. It is noted that the described hysteresis may be applied in both cases, i.e., in case the interference from the introduced cellular radio network to the existing cellular radio network is measured, and in case the interference from the existing cellular radio network to the introduced cellular radio network is measured.

It is noted that a computer readable medium may be provided having a program recorded thereon, where the program is to make a computer or system of data processing devices execute functions of the above described elements. A computer readable medium can be a magnetic or optical or other tangible medium on which a program is recorded, but can also be a signal, e.g. analog or digital, electromagnetic or optical, in which the program is embodied for transmission.

Further, a computer program product may be provided comprising the computer readable medium.

In the following a further embodiment of the invention will be described with respect to FIG. 4. FIG. 4 shows a sequence of steps performed for arranging or re-arranging cell clusters of the introduced cellular radio network in a given geographical area which is already covered by an existing cellular radio network, for example as performed by the control means described with respect to FIG. 3.

In a first step S401 an area is determined by connecting at least two cells of the existing cellular radio network, the at least two cells using the same transmission frequency. In case two cells of the existing cellular radio network are connected, a corridor may be defined, e.g. determined by the width of the cells of the existing cellular radio network. In case the area is determined by connecting three cells of the existing cellular radio network, a triangle is obtained, which preferably does not cover any other cells of the existing cellular radio network using the transmission frequency of the cells used for defining the triangle, i.e. cells at the corners of the triangle. Further, four or more cells of the existing cellular radio network may be used to determine the area.

In the following, in a step S402 at least one cell of the cellular radio network to be introduced is arranged in a cell cluster, and in a step S403 the center of the cell cluster is located in the area determined in step S401.

As outlined with respect to previous embodiments, the cell cluster to be located in the determined area will be arranged to use the same transmission frequency as the cells of the existing cellular radio network used for determining the area.

In step S402 the number of cells of the cell cluster to be introduced into the area may be determined in accordance with interference measurements or estimated interference from the cell cluster of the cellular radio network to be introduced to the cells of the existing cellular radio network. As the interference will depend on the size of the cells of the cell cluster, in case the interference is high, a larger number of cells may be arranged in a cell cluster. Further, the number of cells in a cell cluster may also be determined by the number of subscribers, terrain characteristics and similar.

For the dimensioning of the transmit power and the cell size of the cells of the cell cluster, the dependency between the cumulative power emitted from the cell cluster of the introduced cellular radio network and the cell size of a cluster of the introduced cellular radio network may be used, as it may be derived as follows.

The propagation attenuation L, e.g. of a base station of the introduced cellular radio network versus distance d to a transmitter, e.g. of a base station may be assumed to be of Okumura Hata type, as described in Hata Masahura "Empirical Formula for Propagation Loss in Land Mobile Radio Services", IEEE Transactions on Vehicular Technology, Vol. VT-29, No. 3, pp. 317–325, August 1980 with parameters $L_{0,2}$ and $\xi_2$:

$$L = L_{0,2} \cdot d^{\xi_2} \qquad \text{Eq. 1}$$

wherein $L_{0,2}$ and $\xi_2$ depend on parameters as the frequency and used antenna, terrain characteristics and similar.

The transmit power P required in one cell of the cell cluster depends on the radius $r_2$ as follows:

$$P = f(k) \cdot r_2^{\xi_2} \qquad \text{Eq. 2}$$

wherein $r_2$ is the radius of a cell of a cell cluster and k is the number of users in the cell of the cell cluster. f(k) is a non decreasing function of k. For example, if the transmit power P is independent of the number of users (as it is the case for broadcast systems) then f(k)=c with c being a constant.

For equation 2 it is assumed that the cell has a circular border and that the base station is located at the center of the circle. It is furthermore assumed that the users are randomly distributed in the cell with uniform distribution.

The transmit power P is an average power over dimensions time t, user u and user distribution z.

P (z, u, t) is denoted the power used for a given user distribution z at a time t for a user u. P (z, u, t) may be the power used by the mobile station of the user, when the uplink connection from the user to the base station is considered, or it may be the power used by the base station for the connection to the mobile station of the user, if the downlink is considered.

The function f(k) depends on the radio access technology of the introduced cellular radio network.

For system like UTRAN with user individual transmit power control that regulates the carrier to interference ratio at the user to a constant (possibly user individual) target, f(k) approaches a positive minimal value a for k→0 (a>0 is caused by the power required for broadcast control channels) and the first and second derivative of f(k) is positive, as outlined in Kimmo Hiltunen, Riccardo de Bernardi: WCDMA capacity estimation; VTC 2000 spring, pages 992–996, May 2000, Tokyo, Japan. However, this is an example only.

For these systems, f(k) may also increase with the interference floor caused from the existing cellular radio network to the introduced cellular radio network, and thus the interference from the existing cellular radio network to the introduced cellular radio network influences P.

The number of users in a hexagonal cell of the introduced cellular radio network depends on the given user density U and on $r_2$ as follows:

$$k = \frac{3 \cdot \sqrt{3}}{2} U \cdot r_2^2 \qquad \text{Eq. 3}$$

and, in case the size of a cell cluster is equal to the size of a cell of the existing cellular radio network, the number N of cells per cell cluster of the introduced cellular radio network depends on $r_2$ and the cell radius $r_1$ of the cells of the existing cellular radio network:

$$N = \frac{r_1^2}{r_2^2} \qquad \text{Eq. 4}$$

Finally, the cumulative transmit power of all N cells of a cell cluster of the introduced cellular radio network may be written as:

$$P_{tot} = \frac{r_1^2 \cdot f\left(\frac{3 \cdot \sqrt{3}}{2} U \cdot r_2^2\right) \cdot r_2^{\xi_2}}{r_2^2} \qquad \text{Eq. 5}$$

As $\xi_s > 2$ and f(k)→a for k→0 follows Ptot→0 for $r_2$→0. This means that the interference from the introduced cellular radio network to the existing cellular radio network can be made arbitrarily small for decreasing $r_2$.

As $P_{tot}$ must be limited in order to avoid excessive interference from the introduced cellular radio network to the existing cellular radio network, the cell radius $r_2$ should be adapted accordingly. The limit on the largest acceptable $P_{tot}$ may be determined by the propagation attenuation from the cell cluster of the introduced cellular radio network to a cell of the existing cellular radio network using the same frequency and by a tolerable interference from the introduced cellular radio network to the existing cellular radio network.

Thus, in step S402 the cell cluster parameters, as cell size, transmit power etc., may be determined or adjusted. The adaptation of the transmit power and the cell site density of the introduced cell cluster, i.e. the number of cells of the introduced cell cluster and its size has to be performed in dependency on each other. An increase of the number of cells allows a decrease of the transmit power and enables a decrease of the cumulative power that emits from the cell cluster. The cumulative power of a cell cluster determines the interference caused to the existing cellular radio network. The cell site density will preferably be set to the smallest value for which the interference is still acceptable.

While it may be preferred that the cell cluster uses one transmission frequency, i.e. should be designed for a frequency reuse factor 1 or must at least be able to achieve acceptable performance for this reuse factor, larger reuse factors for the cell cluster are possible. In this case for each frequency it could be decided separately if it can be used in the cluster, i.e., whether it fulfils the above-stated requirements.

Steps S401, S402 and S403 may be repeated for a plurality of cell clusters of the introduced cellular radio network to be arranged adjacent to one another in order to obtain a full coverage of a given geographical area. Preferably the size of a cell cluster also depends on an overall number of cell clusters to be introduced and their size. It may be desirable to adjust the size of a cell cluster approximately equal to the size of a cell of the existing cellular radio network, in which case an even distribution of cell clusters may be achieved.

It is noted that a plurality of cellular radio networks may be arranged according to the described method, i.e., the cellular radio network referred to as existing cellular radio network may already be a cellular radio network introduced into another existing cellular radio network.

In the following, a further embodiment of the invention will be described with respect to FIG. 5. FIG. 5 outlines a sequence of steps for arranging or re-arranging a number of cell clusters of the cellular radio network to be introduced in a geographical area which is already covered by an existing cellular radio network.

In a first step S501 the center of an area of a smallest polygon obtained by connecting at least two cells of the existing cellular radio network with the same transmission frequency is determined.

In case two cells of the existing cellular radio network are used for determining the polygon or shape, the center may be a location at midpoint between the two cells used for defining the polygon. In case for example three cells using the same transmission frequency of the existing cellular radio network are used for determining the polygon or shape, a triangle will be obtained, which, in case the cells of the existing cellular radio network are evenly distributed, will be equilateral. The requirement of the smallest polygon or shape connecting cells using the same transmission frequency assures that no other cells of the existing cellular radio network using the transmission frequency of cells used for determining the polygon are located inside the area of the polygon or shape. The requirement of determining the center assures that the distance from the center to the cells of the existing cellular radio network at the corner points of the polygon is as large as possible for all used cells of the existing cellular radio network.

Instead of the center of the polygon it is also possible that a center of gravity of the polygon is determined, or any other point in the area of the polygon allowing a large distance between the determined point and the cells at the corner points of the polygon. Any other point inside the area may be defined which provides a good tradeoff between the obtained distances between the determined point and the cells at the corners of the polygon.

In a step S502 the center of a cell cluster using the same transmission frequency as the cells used for determining the polygon is located at the point inside the area determined in step S501, e.g., the center of the area of the polygon, the center of gravity or similar.

It is noted that in practical cases according to terrain characteristics, subscriber densities and similar the center of the cell cluster may not always be located exactly at the determined point inside the polygon, the described rules are rather to be considered as guidelines for locating cell clusters.

In a step S503 the size of the introduced cell cluster is adjusted such that it preferably does not overlap with cells of the existing cellular radio network at the corner points of the polygon which are using the same transmission frequency as the cell cluster. While this determines a preferred maximum size of a cell cluster, a practical size of a cell cluster may be chosen smaller than the defined rule, e.g., within the range of the sizes of the cells of the existing cellular radio network.

In a step S504 the above steps S501–S503 are repeated in order to arrange a plurality of cell cluster adjacent to each other for entirely covering the given geographical area.

The described method allows to arrange cell clusters containing at least one cell of the introduced cellular radio network in a geographical area which is already covered by cells of an existing cellular radio network while avoiding an interference between the cellular radio networks to be maintained at a tolerable level. The cell clusters, i.e., the cell site density, transmission power and similar may be adjusted, as outlined before with respect to the embodiment of FIG. 4.

In the following, a further embodiment of the invention will be described with respect to FIG. 6. FIG. 6 describes in further detail a method to adjust the cell clusters of the introduced cellular radio network in order to maintain an overall interference between the cellular radio networks within a tolerable level. The steps outlined with respect to FIG. 6 may be performed during arranging the cell clusters, i.e., during establishing the cellular radio network to be introduced, or may be used in adjusting the cell clusters of the introduced cellular radio network to changing requirements, e.g. in case the existing cellular radio network is changed by altered circumstances such as user density, environmental changes such as buildings and similar. The steps may be performed, for example by the control means described with respect to FIG. 3.

Further, the steps may be used to adjust the introduced cellular radio network in case conditions of the introduced cellular radio network change, e.g. subscriber number, terrain changes as before and similar.

In a first step S601 the interference from the introduced cellular radio network to the existing cellular radio network is measured, preferably at selected locations, e.g. defined by base stations or selected according to statistical considerations. The interference may be measured at the selected locations by the operator of the existing cellular radio network or by any other entity and may be provided to the operator of the introduced cellular radio network.

In a step S602 it is preferably determined which cell clusters actually cause the measured interference, measured in step S601, i.e., which cell clusters of the introduced cellular radio network are responsible for the interference measured at at least one selected location. This may be for example a number of cell clusters in the vicinity of the measurement location, e.g. cell clusters using a particular frequency or similar.

In a step S603 the size of the cells of the cell clusters determined in step S602 may be reduced and/or new cells may be introduced into the cell clusters of the introduced cellular radio network, in order to maintain a full coverage of the given geographical area. Further, it is possible that the size of a particular cell cluster is reduced, and further cell clusters are introduced or neighboring cell clusters are increased in size, according to further interference measurements.

An increased interference may be due to increased numbers of subscribers in one or both of the existing cellular radio network and introduced cellular radio network, or may be due to terrain changes or other conditions such as weather, subscriber activity and similar.

Steps S601–S603 may be repeated for a larger number of locations, if necessary, in order to adjust all areas of the introduced cellular radio network according to interference measurements. The threshold for the interference may be set by an operator of the existing cellular radio network, by a regulating authority or may be self-imposed by the operator of the introduced cellular radio network.

Figure 7:
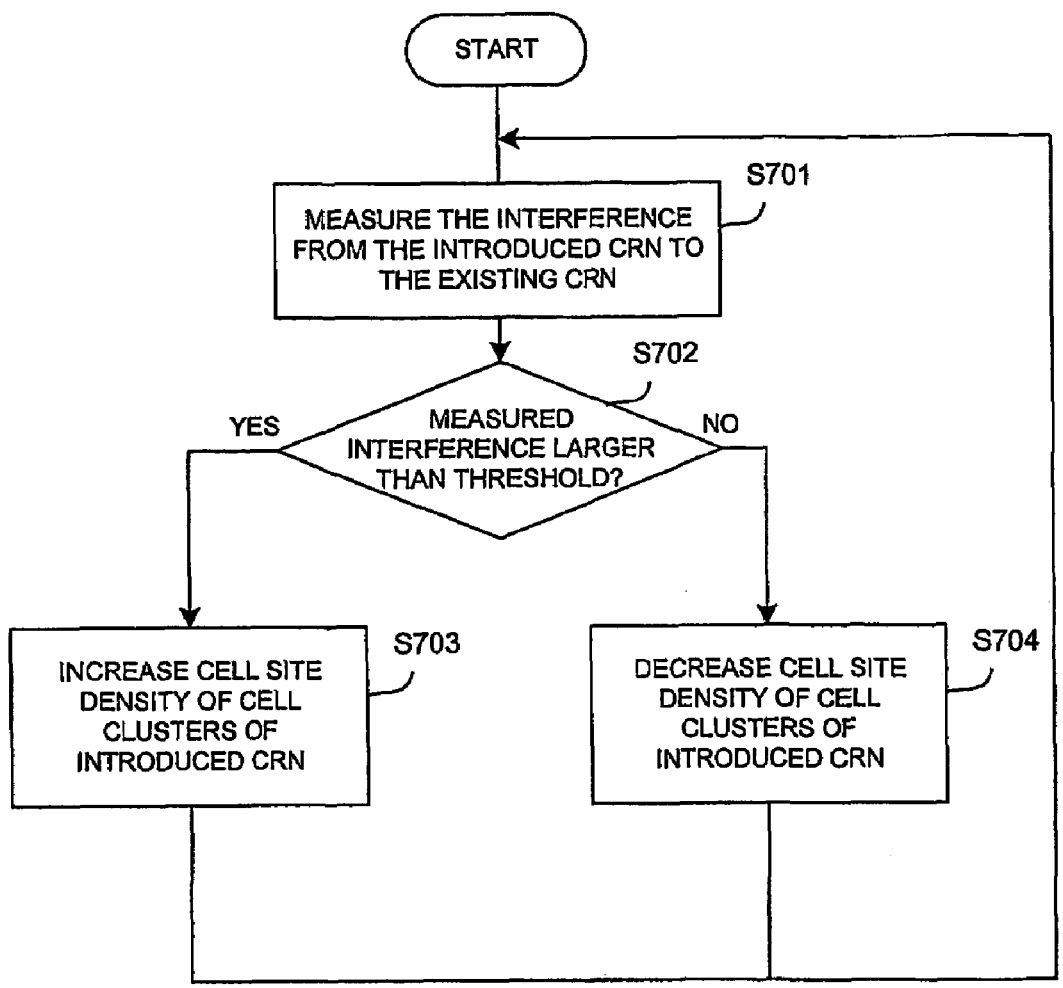
FIG. 7 illustrates steps for adjusting cell parameters according to another embodiment of the invention.

In the following a further embodiment of the invention will be described with respect to FIG. 7. FIG. 7 shows a sequence of steps of adjusting the cell clusters of the introduced cellular radio network, e.g., in a particular area determined to influence an interference measurement taken at a selected geographical location.

In a first step S701 the interference from the introduced cellular radio network to the existing cellular radio network is measured, e.g. at a selected location, as outlined with respect to previous embodiments.

In a step S702 it is determined whether the measured interference is larger than a threshold and if the decision in step S702 is "yes", in a step S703 the cell site density of clusters of the introduced cellular radio network is increased, i.e., new cells may be introduced into the cell clusters and/or the cell size of the cells of the cell clusters may be reduced. Since this may cause a reduced transmit power of the cells and an reduced overall transmit power of the cell cluster, step S703 may reduce the interference measured.

In case the decision in step S702 is "no", in a step S704 the cell site density of the cell clusters of the introduced cellular radio network is decreased, e.g., cells may be removed from cell clusters and/or a transmit power may be increased in order to increase the radius of a cell of the cell cluster.

Following to step S703 and S704 the flow returns to step S701, and the adjustment step is repeated. The steps outlined with respect to FIG. 7 may be repeated for a plurality of selected geographical locations, as outlined before.

The adaptation process described in FIG. 7 allows to maintain the interference from the introduced cellular radio network to the existing cellular radio network around the level of the defined threshold and thus allows to maintain proper operation of both networks.

The introduced cellular radio network may be designed to employ macro diversity techniques. However in this case there is the drawback that further borders between cells of the introduced cellular radio network are established that use different frequencies. Applying macro diversity with different frequencies may be implemented using two separate receivers, which, however, is expensive.

In a further advantageous embodiment the invention allows to introduce macro diversity at reduced costs.

The distance from a cell border, within which macro diversity is effective, depends on the cell size and consequently the size of the border areas lacking macro diversity are reduced with the cell size of the cell clusters. However, cells may not be arbitrarily small.

Therefore, according to this embodiment of the invention, in a cell cluster using a frequency group X the border cells may use one frequency of a frequency group Y, which is a frequency group used by an adjacent cell cluster, as a replacement for one frequency of the frequency group X. The same may be applied for all cells of cell clusters at borders between two cell clusters using any other pair of frequency groups than X and Y.

Accordingly, a first cluster may be arranged to use a first set of transmission frequencies, and a second cluster located adjacent to the first cluster may be arranged to use a second set of frequencies. And at least one cell at the periphery of the first cell cluster may be arranged to use at least one transmission frequency of the second set of transmission frequency and at least one cell at the periphery of the second cell cluster may be arranged to use at least one transmission frequency of the first set of transmission frequencies and adjacent cells may use at least one identical transmission frequency.

It is noted that the method steps for locating and adjusting the cell clusters of the introduced cellular radio network as well as steps for measuring an interference may be implemented by programs including coded instructions for execution on a data processing unit or a plurality of data processing units connected by a network or by dedicated communication links.

Figure 8:
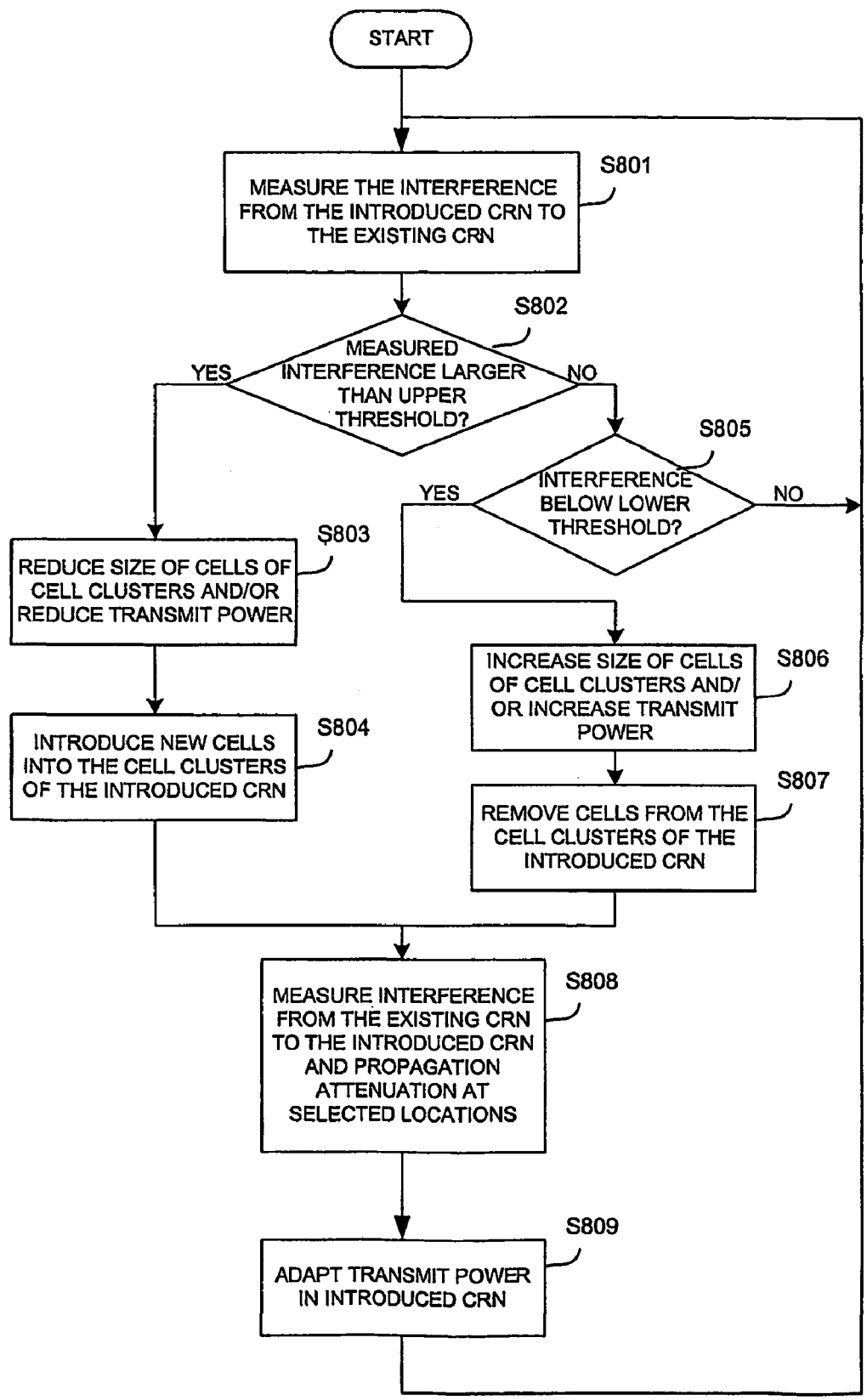
FIG. 8 illustrates steps of adjusting cell parameters of the introduced cellular radio network according to another embodiment of the invention.

In the following a further embodiment of the invention will be described with respect to FIG. 8. FIG. 8 describes a further sequence of steps for arranging and/or adjusting cell clusters of the introduced cellular radio network to an existing cellular radio network in a given geographical area.

In a first step S801 the interference from the introduced cellular radio network to the existing cellular radio network is measured, e.g. at a selected location, as outlined before.

In a step S802 it is determined whether the measured interference is larger than a predefined upper threshold, e.g. defined as outlined before by the operators of the networks or a regulating authority.

In case in step S802 the decision is "yes" in a step S803 the size of cells of the cell clusters of the introduced cellular radio network may be reduced and/or a transmit power may be reduced. The cell clusters to be adjusted according to step S803 may be determined beforehand, e.g., cell clusters which cause the measured interference, e.g., cell clusters in the vicinity of a measurement location for measuring interference and/or cell clusters using specific frequencies in a particular area.

In a step S804, since the size of the cells of the cell clusters are reduced, new cells are introduced into the cell clusters, in order to maintain four geographical coverage.

In case in step S802 the decision is "no", in a step S805 it is determined whether the interference is below a lower determined threshold, e.g. defined as before.

In case in step S805 the decision is "no", the flow returns to step S801.

In case in step S805 the decision is "yes", in a step S806 the size of the cells of the cell clusters is increased and/or the transmit power is increased. The cell clusters may be determined as outlined with respect to step S803.

In the following, in a step S807 cells from the cell clusters of the introduced cellular radio network are removed, as after increasing the size of cells a reduced number of cells is necessary for full coverage of a geographical area.

After steps S804 and S807 in a step S808 the interference from the existing cellular radio network to the introduced cellular radio network may be measured and a propagation attenuation at selected locations from the measurement positions to serving base stations of the introduced cellular radio network may be measured. In a step S809 the transmit power in the introduced cellular radio network may be adapted in accordance with the measurements of step S808.

Interference determining means may be provided for receiving a value indicating an interference and from the existing cellular radio network to the introduced cellular radio network; and the adjusting means may reduce the size of at least one cell of at least one cell cluster of the introduced cellular radio network and introduce new cells into the at least one cell cluster, in case the measured interference from the existing cellular radio network to the introduced cellular radio network is larger than a predetermined threshold. The adjusting means may further increase the size of at least one cell of at least one cell clusters and remove at least one cell from at least one cell cluster of the introduced cellular radio network, in case the measured interference from the existing cellular radio network to the introduced cellular radio network is smaller than another predetermined threshold.

It is, however, noted that steps S808 and S809 may be optional. After step S809 the flow returns to step S801.

The method steps outlined with respect to FIG. 8 allow to adjust the introduced cellular radio network to meet interference requirements, while avoiding a continuous adaptation process by introducing a hysteresis between the upper and lower defined threshold. In case the interference is between the upper and lower threshold, no adaptation step is required, reducing operational costs. Further, the steps described in FIG. 8, particularly steps S808 and S809 allow to adjust the cell clusters of the introduced cellular radio network to interference measurements of an interference from the existing cellular radio network to the introduced cellular radio network, in order to avoid deteriorated operation of the introduced cellular radio network.

It is noted that a computer readable medium may be provided having a program recorded thereon, where the program is to make a computer or system of data processing devices execute functions of the above described method steps. A computer readable medium can be a magnetic or optical or other tangible medium on which a program is recorded, but can also be a signal, e.g. analog or digital, electromagnetic or optical, in which the program is embodied for transmission.

Further, a computer program product may be provided comprising the computer readable medium.

Figure 9:
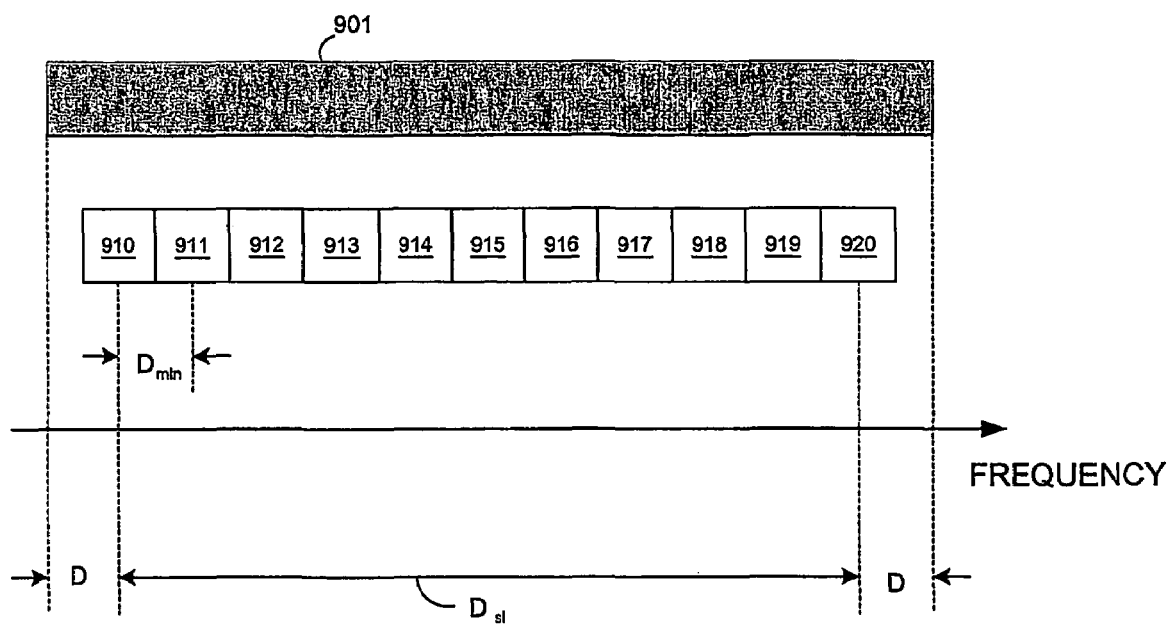
FIG. 9 illustrates an allocation of transmission frequencies according to an embodiment of the invention, if the radio channel bandwidth of the existing cellular radio network is considerably larger than the radio channel bandwidth of the introduced cellular radio network.

In the following a further embodiment of the invention will be described with respect to FIG. 9. FIG. 9 shows an embodiment where the radio channel bandwidth of the existing cellular radio network is considerably larger than the bandwidth of a radio channel of the introduced cellular radio network. Reference numeral 901 in FIG. 9 exemplary illustrates a radio channel bandwidth of the existing cellular radio network. Further, FIG. 9 shows radio channels of the introduced cellular radio network 910–920 adjacent to one another. In FIG. 9 frequency is denoted in horizontal direction.

A transmission frequency as described with respect to the previous embodiments may include at least one radio channel.

The radio channels 910–920 may be obtained as outlined in the following.

D denotes a frequency separation from the smallest carrier frequency of the cell cluster of the introduced cellular radio network, in this example including radio channels 910–920, to the lower limit of the radio channel bandwidth of the existing cellular radio network, and, likewise the frequency separation from the largest carrier frequency of the cell cluster of the introduced cellular radio network to the upper limit of the radio channel bandwidth of the existing cellular radio network.

$D_{min}$ denotes a frequency separation between the carrier frequencies of adjacent radio channels, i.e. transmission frequencies of the cell cluster of the introduced cellular radio network.

$D_{sl}$ denotes the resulting frequency separation between the smallest and the largest transmission frequency of the cell cluster and is an integer multiple of the given minimum carrier frequency separation of the introduced cellular radio network.

If the radio channel bandwidth of the existing cellular radio network is more than twice the radio channel network of the introduced cellular radio network, then it may be unreasonable to reuse only a single carrier or transmission frequency per transmission frequency of the existing cellular radio network in a cell cluster of the introduced cellular radio network. Instead, it may be beneficial to use multiple carrier frequencies for the cell cluster of the introduced cellular radio network. The individual carrier or transmission frequencies may be allocated as shown in FIG. 9, i.e. adjacent to each other in a certain frequency range.

The frequency separation D from the smallest transmission frequency of the cell cluster to the lower limit of the radio channel bandwidth of the existing cellular radio network and likewise from the largest transmission frequency of the cell cluster to the upper limit of the channel bandwidth of the existing cellular radio network is chosen such that it is larger than a given minimum required separation $D_{min}$ illustrated in FIG. 9.

The frequency separation D may be further chosen such that the resulting frequency separation $D_{sl}$ between the smallest and largest carrier frequency of the cell cluster is an integer multiple of the given minimum carrier frequency separation of the introduced cellular radio network. In addition to the thus defined smallest and largest carrier frequency of the cell cluster of the introduced cellular radio network, $N=D_{sl}/D_{min}-1$ further carrier frequencies $f_n$ may be chosen, each at an individual offset of $n-D_{min}$ from the smallest carrier frequency of the cell cluster of the introduced cellular radio network.

The resulting N+1 (=11 in the present case) carrier frequencies 910 to 920 for the cell cluster are allocated to cells of the introduced cellular radio network in the cell cluster according to the frequency planning method appropriate for cellular radio networks to be introduced and without considering the interference from existing cellular networks.

The above is an example which makes it possible to use multiple carrier frequencies for a cell cluster of the introduced cellular radio network. It is noted that this is also possible even in case the existing cellular radio network uses only a single transmission frequency per cell.

In the following a further embodiment of the invention will be described with respect to FIG. 10.

The foregoing embodiments of the invention mainly considered the occurrence of interference between cell clusters of the introduced cellular radio network and the cells of the existing cellular radio network using the same transmission frequency, and provided means to appropriately design and arrange the introduced cellular radio network.

However, interference between cell clusters of the introduced cellular radio network and the cells of the existing cellular radio network using adjacent transmission frequencies may also pose a problem.

Figure 10:
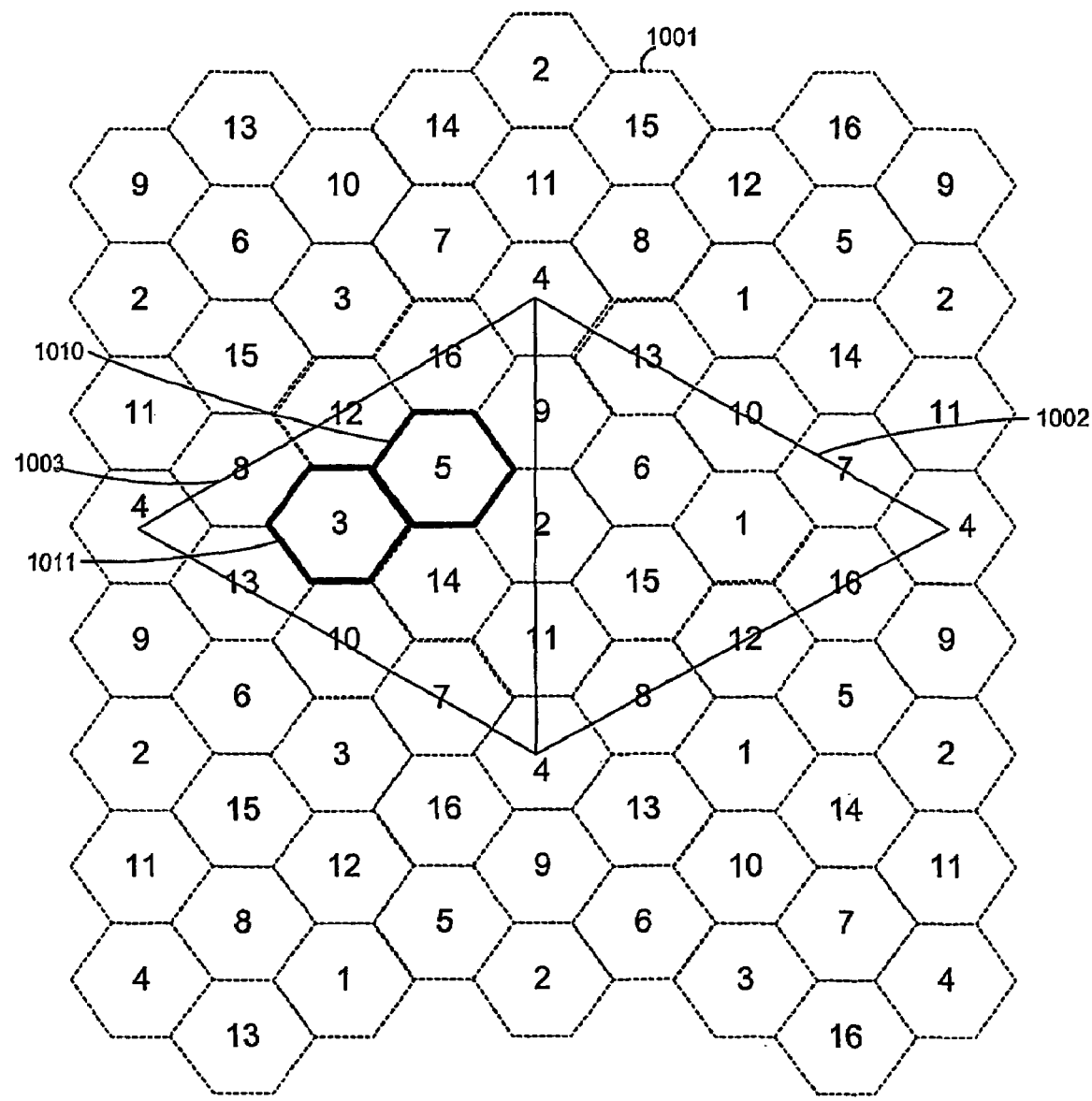
FIG. 10 illustrates steps for adjusting a frequency plan of the existing cellular radio network according to another embodiment of the invention.

FIG. 10 illustrates operations for adjusting a frequency plan of an existing cellular radio network in order to more efficiently accommodate an introduced cellular radio network, which is superimposed on the existing cellular radio network as it was for example outlined with regard to previous embodiments. The embodiment of FIG. 10 considers the problem of interference between cells and cell clusters using adjacent transmission frequencies (adjacent channel interference).

In FIG. 10 it is shown how an interference between the existing cellular radio network and the introduced cellular radio network can be effectively reduced by adjusting the frequency plan of the existing cellular radio network such that cells of the existing cellular radio network using transmission frequencies adjacent to transmission frequencies used by the introduced cellular radio network are located far away from such cells of the introduced cellular radio network, in order to reduce an adjacent channel interference. As mentioned above, the previous embodiments mainly dealt with arranging and adjusting cells of the cellular radio networks considering co-channel interference, i.e., interference from cells of the respective other cellular radio network using the same transmission frequency.

However, in order to further improve the results upon introducing a cellular radio network into an existing cellular radio network, further to the co-channel interference, the adjacent channel interference can be advantageously considered. Adjacent channel interference is an interference which is caused between cells of the existing cellular radio network and the cells of the introduced cellular radio network on adjacent transmission frequencies, i.e., this considers the interference from one cell of one cellular radio network using a first transmission frequency to a cell of the other cellular radio network using a second transmission frequency, wherein the first and second transmission frequencies are adjacent to one another, i.e. in general transmission frequencies which cause an interference, e.g. because they are lying in neighboring frequency band or only little apart from each other in frequency direction.

Adjacent channel interference occurs because the radiated power of a transmitter and the sensitivity of a receiver is not entirely confined to an assigned radio channel bandwidth. Some power of the transmitter is leaking into adjacent radio channels and some power of adjacent radio channels is leaking into the receiver. In other words, power transmitted on one transmission frequency leaks into the frequency band of a neighboring transmission frequency, for example in upward or downward frequency direction. Therefore, a frequency planning may be applied to maximize the propagation attenuation, i.e. path loss, between cells of the respective cellular radio networks using adjacent transmission frequencies.

In the following explanation it is assumed that the path loss between a mobile station and a base station deterministically depends only on the distance between the mobile station and the base station, i.e., a random shadowing and directional antennas are not considered in the present case. Under this assumption it is the goal to maximize the path loss between cells using adjacent radio channels, which is equivalent to maximizing the distance between the cells. Obviously, the larger the distance between two cells, the lower an interference accounted.

The locations X maximizing the minimum of the path loss from these location to all cells of a cellular radio network, the cells using the same radio channel or transmission frequency C, may be considered to be exactly those locations $X'_{1,C\pm1}$ within an area obtained by connecting at least two cells of the cellular radio network using the same transmission frequency, as it was outlined with respect to previous embodiments for locating cell clusters of the introduced cellular radio network.

The cellular radio network may for example be the existing cellular radio network and the locations may for example be the center of the smallest (equilateral) triangle connecting those co-channel cells, i.e. the cells using the same transmission frequency, as outlined before.

Consequently, it is optimal for an existing cellular radio network to allocate transmission frequencies C+1 and C−1 to cells of the existing cellular radio network closest to the locations $X'_{1,C\pm1}$.

However, these locations are also those locations $X_{1,C}$ on which advantageously the center of a cell cluster of the introduced cellular radio network should be placed, the cell cluster also using transmission frequency C. As a result, the area of the cell cluster of the introduced cellular radio network could be overlapping with a cell of the existing cellular radio network using one of the adjacent transmission frequencies C+1 and C−1, if those are allocated to the cells of the existing cellular radio network as described for example with respect to the previous embodiments.

For example, in the exemplary embodiment described with respect to FIG. 3, a cell cluster 301 of the introduced cellular radio network using a transmission frequency B is overlapping with a cell of the existing cellular radio network using the adjacent transmission frequency A, and the cell cluster of the introduced cellular radio network using the transmission frequency C is overlapping with a cell of the existing cellular radio network using the adjacent transmission frequencies B and D.

Under certain circumstances, this can cause large adjacent channel interference between the existing cellular radio network and the introduced cellular radio network. The amount of interference may for example depend on the fraction of overlap between a cell cluster of the introduced cellular radio network and a cell of the existing cellular radio network using adjacent transmission frequencies. For example, for a frequency reuse factor of 9, a subset of the cells using the transmission frequencies or channels C±1 of the existing cellular radio network are exactly at the locations $X'_{1,C\pm1}$, and thus the entire cell area of the cells in this case is overlapping with the cell clusters of the introduced cellular radio network, the cell clusters centered at the locations $X_{1,C}$.

In the previous embodiments, in order to be able to reuse every transmission frequency of the respective cellular radio network, it may be possible that co-channel cell clusters are not placed in adjacent equilateral triangles with common edges, i.e., the cell clusters of the introduced cellular radio network are for example only placed in every second equilateral triangle (or other area) defined by connecting cells of the existing cellular radio network using the same transmission frequency.

Thus, cell clusters of the introduced cellular radio network may only be arranged in a subset of the group of all possible equilateral triangles (or other areas defined by connecting at least two cells of the existing cellular radio network), i.e., for example every second such area, as mentioned above.

Considering an optimum frequency planning within the existing cellular radio network, that takes into account adjacent channel interference, the channels or cells using the transmission frequency C−1 or C+1 could be advantageously allocated closest to locations $X'_{1,C\pm1}$, i.e., cells of the existing cellular radio network using the adjacent transmission frequencies could be located within such areas defined by connecting at least two cells of the existing cellular radio network using the same transmission frequency (i.e., neighboring to the "adjacent" transmission frequency) which are not already occupied by a cell cluster of the introduced cellular radio network using this transmission frequency. In other words, one group of the areas defined by connecting cells of the existing cellular radio network using the same transmission frequency would be occupied by a cell cluster of the introduced cellular radio network using this transmission frequency, whereas the remaining subgroup of such areas would have located therein, for example at or close to the center of the areas, cells of the existing cellular radio network using the adjacent transmission frequencies.

The present embodiment aims at increasing the minimum of the distances from the cells of the existing cellular radio network to the cell clusters of the introduced cellular radio network using adjacent transmission frequencies to the transmission frequencies of the cells of the existing cellular radio network, while keeping the adjacent channel interference within the existing cellular radio network negligible.

FIG. 10 illustrates cells of an existing cellular radio network 1001 with a specifically adapted frequency plan with a reuse factor of 16. Further, in the embodiment outlined with respect to FIG. 10, it is assumed that the areas chosen for arranging cell clusters of the introduced cellular radio network constitute the smallest equilateral triangles connecting three cells of the existing cellular radio network using the same transmission frequency. However, it is noted that this is an assumption only, and that in other embodiments different areas connecting cells of the existing cellular radio network using the same transmission frequency may be formed, as outlined with respect to previous embodiments.

FIG. 10 shows two equilateral triangles 1002 and 1003 connecting cells of the existing cellular radio network using a transmission frequency 4.

It is assumed that the triangle 1002 is occupied by a cell cluster of an introduced cellular radio network (not shown) and that therefore the triangle 1002 is not available for arranging cells of the existing cellular radio network using the transmission frequencies adjacent to transmission frequency 4, i.e. the cells of the existing cellular radio network using the transmission frequencies 3 or 5.

Further, it is assumed that triangle 1003 is not occupied by a cell cluster of the introduced cellular radio network using a transmission frequency 4.

This covers a case, which, as outlined above, may occur upon introducing a cellular radio network into an existing cellular radio network, wherein not all areas defined by connecting cells of the existing cellular radio network using the same transmission frequency are occupied by cell clusters of the introduced cellular radio network using this transmission frequency.

According to the above, the cells of the existing cellular radio network using the adjacent transmission frequencies to the transmission frequency 4, i.e., using transmission frequencies 3 or 5, are located at or close to the center of the equilateral triangle 1003, while in triangle 1002 no cells of the existing cellular radio network using transmission frequencies 3 or 5 are placed. In the present example, the frequency plan of the existing cellular radio network is adapted such that a cell 1010 using the adjacent transmission frequency 5 and a cell 1011 using the adjacent transmission frequency 3 is located in the triangle 1003 formed by connecting the cells using the transmission frequency 4. The cells may be located as close as possible to the center of the area, or one of the cells using an adjacent frequency is located at the center of the area, while the other one is located in some distance from the center. Any other arrangement of the cells or only one cell using an adjacent transmission frequency within the area is possible, e.g. also empirically, to reduce the adjacent channel interference.

FIG. 10 only presents an example for arranging cells using frequencies 3 and 5, and it is understood that any other transmission frequencies may be considered. Further, any other area different from triangles may be considered, as for example outlined with respect to previous embodiments.

The adapted frequency plan of the existing cellular radio network, i.e., a frequency plan as shown in FIG. 10, may be obtained at the time of deployment of the cellular radio network, or may be obtained by subsequent adjustment of the frequency plan of the cells of the existing cellular radio network, for example, after deploying the introduced cellular radio network.

Using the above technique, all cells of the existing cellular radio network using frequencies adjacent to transmission frequencies of the introduced cellular radio network may be appropriately arranged to reduce an adjacent channel interference, i.e., to reduce an interference between cells of the existing cellular radio network and the introduced cellular radio network using adjacent transmission frequencies.

The preferred solution is to place the cells using transmission frequencies C+1 and C−1 at or at least close to the center of the areas obtained by connecting at least two cells of the existing cellular radio network using the transmission frequency C, which do not accommodate clusters of the introduced cellular radio network using the transmission frequency.

The above technique may be applied with particularly advantageous effects if frequency factors larger than 7 are used for the existing cellular radio network. If a frequency plan maximizing the minimum of the distances between cells of the introduced cellular radio network and the existing cellular radio network using adjacent transmission frequencies is used in the existing cellular radio network, then it is feasible to find at least one cell K using a transmission frequency C, so that none of its adjacent channel cells A are adjacent cells to the cell K. Particularly for existing cellular radio networks using frequency reuse factors larger than 7, with the above technique it is possible to reduce the distance between such cells K and cells A using adjacent transmission frequencies, while in parallel the distance between the cells A and the clusters of the introduced cellular radio network using the transmission frequency C is increased. Even though this solution may be somewhat unfavorable for the existing cellular radio network, it achieves the desired effect of reducing the adjacent channel interference between the existing cellular radio network and the introduced cellular radio network, leading to an overall improvement.

Locating in the above case the cells of the existing cellular network close to the centers of the areas, as outlined before, allows to reduce the interference between cells of the existing cellular radio network and the cell clusters of the introduced cellular radio network using adjacent transmission frequencies, as desired.

In another example it is assumed that the transmission frequency used by both a cell cluster of the introduced cellular radio network and at least two cells of the existing cellular radio network constitutes a first transmission frequency.

Further, it is assumed, that a transmission frequency adjacent to the first transmission frequency constitutes a second transmission frequency.

Still further, it is assumed that a first area defined by connecting at least two cells of an existing cellular radio network using the first transmission frequency, and wherein in the first area a cell cluster of an introduced cellular radio network is placed using the first transmission frequency. Thus, the first area is defined as outlined with respect to previous embodiments, i.e., the area defined by connecting at least two cells of the existing cellular radio network using the same transmission frequency, used for arranging therein a cell cluster of the introduced cellular radio network using the same transmission frequency.

In this example a frequency plan of the existing cellular radio network is adapted such that at least one cell of the existing cellular radio network using the second transmission frequency is located at or close to the center of a second area defined by connecting at least two cells of the existing cellular radio network using the first transmission frequency, the first and second area being different from each other.

Also, an apparatus may be provided including adjusting means for adjusting a frequency plan used by the existing cellular radio network as outlined above.

In the following a further embodiment of the invention will be described with respect to FIG. 11.

The solution outlined before with respect to FIG. 10, e.g. placing the cells of the existing cellular radio network using transmission frequencies C+1 and C−1 at or close to the center of areas obtained by connecting at least two cells of the existing cellular radio network using the transmission frequency C, which do not accommodate clusters of the introduced cellular radio network using the transmission frequency C, may not be always possible, e.g. in cases where in all or almost all areas defined as above accommodate cell clusters of the introduced cellular radio network using the transmission frequency C. In these cases it is desired to find another solution to placing the cells of the existing cellular radio network using the transmission frequency C+1 and C−1, as outlined below.

Figure 11:
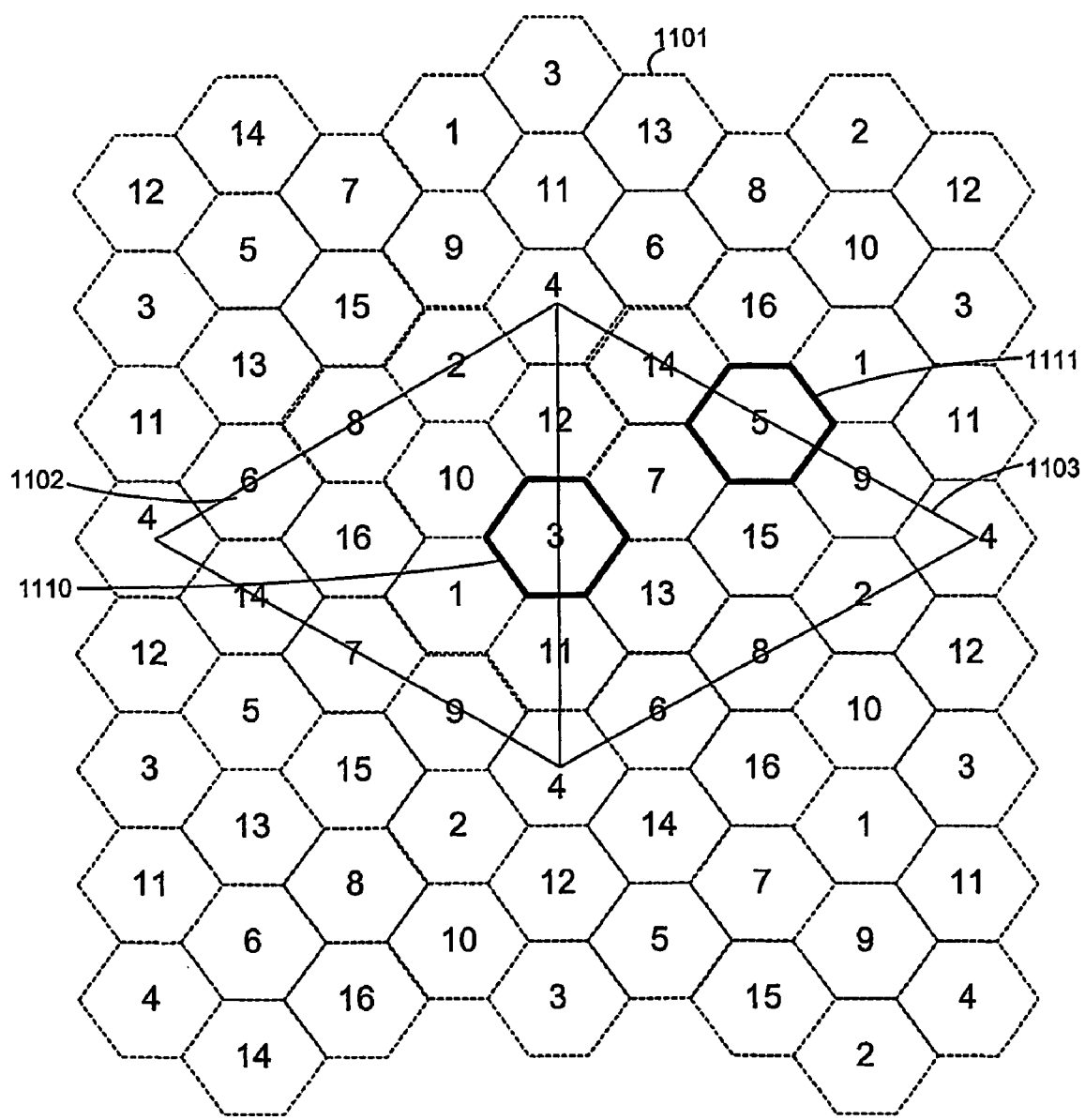
FIG. 11 illustrates steps for adjusting a frequency plan of the existing cellular radio network according to another embodiment of the invention.

Similar to FIG. 10, FIG. 11 shows cells of an existing cellular radio network 1101. In the example of FIG. 11, a frequency plan different from the frequency plan used in FIG. 10 is employed.

Further, FIG. 11 shows two triangles 1102 and 1103 obtained by connecting each three cells of the existing cellular radio network using the same transmission frequency, in the present example transmission frequency 4. While in the shown embodiment again triangles are shown, any other area obtained by connecting cells of the existing cellular radio network using the same transmission frequency may be used, as outlined with respect to previous embodiments.

In the present embodiment it is assumed to be undesirable to place the cells using the adjacent transmission frequencies 3 and 5 (regarding transmission frequency 4) in the middle of the obtained triangles or other areas, as outlined above, for example if cell clusters using the transmission frequency 4 of the introduced cellular radio network are already located near the center of the respective triangles 1102 and 1103.

Therefore, the frequency plan of the existing cellular radio network 1101 is arranged such that cells using transmission frequencies lying adjacent to the transmission frequency 4 used for obtaining the triangles 1102 and 1103 are dislocated from the center of the respective triangle, in a direction closer to the edges of the triangles. As illustrated in FIG. 11, cells 1110 and 1111 of the existing cellular radio network using the adjacent transmission frequencies 3 and 5 are located close to the edges of the triangles.

Accordingly, as in the present case the cells using the adjacent transmission frequencies should not be moved towards the middle of the areas defined by connecting the cells of the existing cellular radio network using the same transmission frequency, to still reduce interference, these cells are moved from the centers of the triangles 1102 and 1103 towards the edges of the triangles. The cells may be moved towards the centers of the edges, to further reduce the increase the interference in the existing cellular radio network.

Locating in the above case the cells of the existing cellular network away from the center closer to the edges of the areas or onto the edges, as outlined before, allows to reduce the interference between cells of the existing cellular radio network and the cell clusters of the introduced cellular radio network using adjacent transmission frequencies, as desired.

While the embodiments of FIG. 10 and FIG. 11 have been described independently, it is possible to merge both approaches, for example in cases where some areas of the existing cellular radio network allow the frequency plan adaptation outlined with respect to FIG. 10 and some allow the frequency plan adaptation outlined with respect to FIG. 11. In this case, where this is possible, the frequency plan of FIG. 10 may be chosen, while in the remaining areas, where a frequency plan such as described with respect to FIG. 10 cannot be employed, a frequency plan such as the one described with respect to FIG. 11 can be employed.

In another example it is assumed that the transmission frequency used by both a cell cluster of the introduced cellular radio network and at least two cells of the existing cellular radio network constitutes a first transmission frequency.

Further, it is assumed, that a transmission frequency adjacent to the first transmission frequency constitutes a second transmission frequency.

Still further, it is assumed that a first area defined by connecting at least two cells of an existing cellular radio network using the first transmission frequency, and wherein in the first area a cell cluster of an introduced cellular radio network is placed using the first transmission frequency.

With these assumptions, in the present example, the frequency plan used by the existing cellular radio network may be adapted such that at least one cell of the existing cellular radio network using the second transmission frequency is dislocated from the center of the first area.

Also, an apparatus may be provided including adjusting means adapted for adjusting a frequency plan used by the existing cellular radio network as outlined above. The apparatus may be used to adjust the frequency plan during deployment of a network or may rearrange a frequency plan.

As outlined above, preferably, the area defined by connecting the cells of the existing cellular radio network using the same transmission frequency is the smallest such area, such as the smallest area connecting two cells of the existing cellular radio network, or three cells or any other number of cells.

Accordingly, the area defined for arranging the cells of the existing cellular radio network using the second transmission frequency, i.e., the adjacent transmission frequency, may include the shortest connection of the centers of two cells of the existing cellular radio network using the first transmission frequency.

Similarly, the second area may be defined by the smallest triangle connecting the centers of three cells of the existing cellular radio network using the first transmission frequency.

In case of an equilateral triangle defining the area for arranging cells using adjacent transmission frequencies, it can be shown that the ratio Q between the distance from a corner cell of the triangle to a cell closest to the center of the triangle and the distance from a corner cell of the triangle to a cell closest to the middle of an edge of the triangle is at most:

$$Q = \frac{D_{clcl}}{\sqrt{3}\left(\frac{D_{clcl}}{2} - D_{cl}\right)} \quad (1)$$

wherein $D_{clcl}$ is the frequency reuse distance and $D_{cl}$ is a cell radius of the existing cellular radio network. For large frequency reuse factors the ratio Q can be approximated by:

$$Q = \frac{2}{\sqrt{3}} = 1.15 \quad (2)$$

For typical propagation conditions this Q translates to an adjacent channel interference increase of about 2 dB, which is negligible, because the co-channel interference is 10–20 dB larger than the adjacent channel interference for typical adjacent channel suppression ratios.

The interference increase on the existing cellular radio network due to the frequency plan adaptation (FIGS. 10, 11) for sufficiently large frequency reuse factors is negligible.

The modified frequency plan shown in FIG. 11, for example, can be designed by starting at a channel 1, assigning channel 1 to an arbitrary cell, denoted reference cell, and to all its co-channel cells defined by the frequency reuse factor. Then channel 2 is assigned to the cell that is located in the middle of the straight line between the reference cell and its closest vertical co-channel cell above. Then the first cell right to the reference cell on the straight line S through the co-channel-cells having an angle of 30° to the horizontal axis is selected and assigned the next not yet assigned channel in the increasing order, which is 3. For this cell the upper adjacent channel is assigned following a procedure analog to the procedure for the reference cell. The next yet unassigned channel, i.e., transmission frequency, is assigned to the cell right to the cell now assigned channel 3 on the line S and so on, until a cell is reached which is already assigned channel 1. Now channels 1 through 8 have been assigned. Channels 9 through 16 are assigned in a similar way, starting with the selection of a new reference cell in the reuse cluster and assigning the next not yet assigned channel 9 to the reference cell.

In the following a further embodiment of the invention will be described with respect to FIG. 12.

Figure 12:
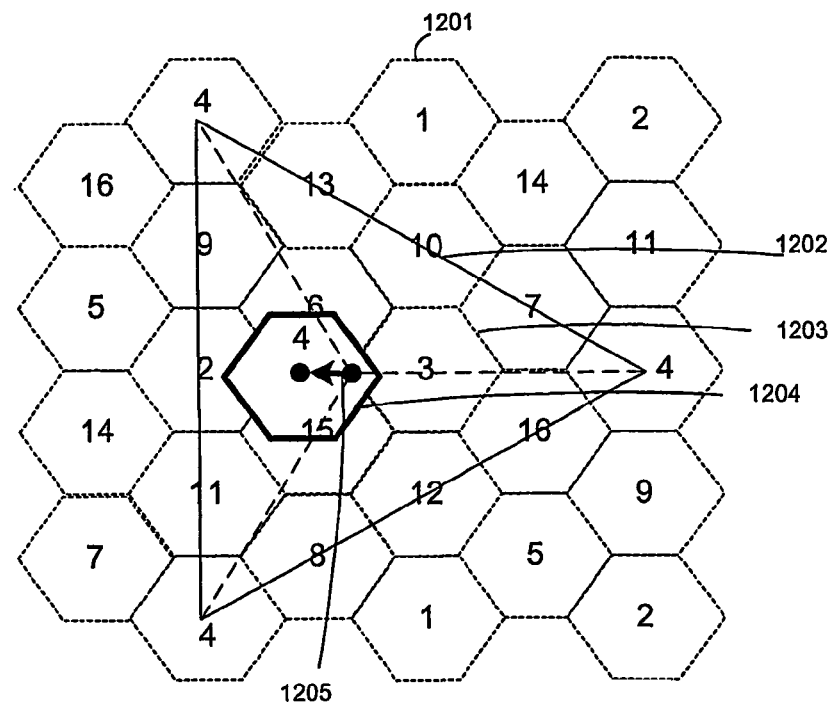
FIG. 12 illustrates steps for adjusting cell parameters of a cellular radio network according to another embodiment of the invention.

FIG. 12 shows a further option for increasing the distances between cells of the existing cellular radio network and the cell clusters of the introduced cellular radio network using adjacent transmission frequencies. The embodiment outlined with respect to FIG. 12 addresses a case, where a cell cluster of the introduced cellular radio network is to be placed into an area defined by connecting at least two cells of the existing cellular radio network using the same transmission frequency, while the cell cluster to be introduced also uses this transmission frequency.

In this case it may occur that a cell of the existing cellular radio network using a transmission frequency adjacent to the transmission frequency of the cell cluster to be introduced is located somewhere in the middle of the defined area, i.e., at a location which is preferred for locating the cell cluster.

In order to reduce the co-channel interference, i.e., the interference between cells of the existing cellular radio network and the cell cluster of the introduced cellular radio network using adjacent transmission frequencies, the cell cluster to be introduced is displaced from the a location in the center of the defined area, e.g. triangle, towards a direction, which increases the distance to the cell of the existing cellular radio network using the adjacent transmission frequency. The location in the center of the area may be an optimum location if only co-channel interference is considered.

FIG. 12 shows a portion of an existing cellular radio network 1201, for example as outlined with respect to previous embodiments. Again, in the existing cellular radio network an area is defined by connecting a plurality of cells of the existing cellular radio network using the same transmission frequency, in the present case, a triangle is defined by connecting three cells of the existing cellular radio network 1201 using the transmission frequency 4, leading to a triangle 1202 shown in FIG. 12.

Further, the frequency plan used for deploying the existing cellular radio network is such that the cell of the existing cellular radio network using the transmission frequency 3, which is the transmission frequency adjacent to the transmission frequency 4, lies approximately in the center of the area 1202. This cell, cell 1203 therefore potentially causes large interference with a cell cluster of the introduced cellular radio network located in the center of the area 1202, as for example outlined with respect to previous embodiments. Accordingly, the cell cluster of the introduced cellular radio network, denoted by a reference numeral 1204, is displaced in a direction directed away from the cell 1203 using the adjacent transmission frequency.

As illustrated by an arrow 1205, in the present example the cell cluster of the introduced cellular radio network 1204 is displaced in a horizontal direction towards the left of FIG. 12, as this maximizes the increase of the distance between cells 1203 and cell cluster 1204.

However, it is noted that this constitutes an example only, any other constellation is theoretically possible, including a constellation, where the dislocation of the introduced cell cluster 1204 maximizes a distance to cells using both adjacent transmission frequencies, i.e., transmission frequency 3 and 5.

The extent of offsetting the introduced cell cluster 1204 may be determined upon interference measurements, e.g., an optimum shift direction and/or shift distance of the cell cluster 1204 may be determined. Further, the optimum shift direction and/or distance may be calculated upon defining the structure of the introduced cellular radio network, and may be based, for example, on interference assumptions.

According to another example, the transmission frequency used by both the cell cluster of the introduced cellular radio network and the at least two cells of the existing cellular radio network may be defined to constitutes a first transmission frequency.

Further, a transmission frequency adjacent to the first transmission frequency may be defined to constitute a second transmission frequency.

In this case, the introduced cellular radio network may be arranged such that the center of a cell cluster of the introduced cellular radio network using the first transmission frequency is dislocated from the center of the area (the area defined by connecting at least two cells of the existing cellular radio network using the first transmission frequency) in a direction increasing the distance from the cell cluster to the cells of the existing cellular radio network using the second transmission frequency.

Also, an apparatus may be provided, including means adapted for dislocating the center of a cell cluster of the introduced cellular radio network using the first transmission frequency from the center of the first area in a direction increasing the distance from the cell cluster to the cells of the existing cellular radio network using the second transmission frequency.

Displacing the cell cluster as outlined above allows to reduce adjacent channel interference and thus improves the overall performance of the system.

In the following a further embodiment of the invention will be described with respect to FIG. 13.

Figure 13:
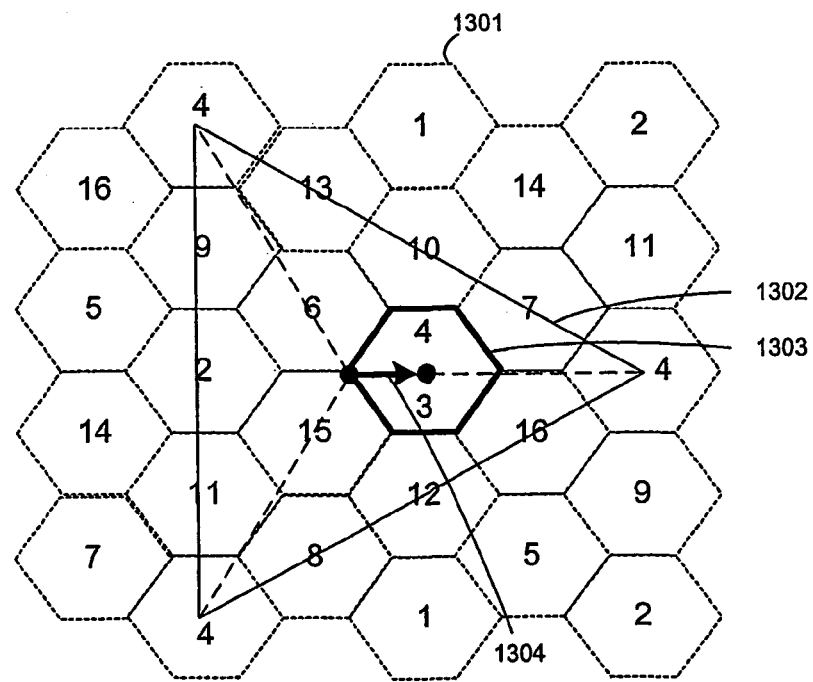
FIG. 13 illustrates steps for adjusting cell parameters of a cellular radio network according to another embodiment of the invention.

FIG. 13 shows a further approach to reduce an adjacent channel interference, i.e. an interference from cells of the existing cellular radio network to cell clusters of the introduced cellular radio network using adjacent transmission frequencies.

In this case, it may also be advantageous to arrange a cell of the existing cellular radio network using a specific transmission frequency at the same location as a cell cluster of the introduced cellular radio network using transmission frequencies adjacent to the specific transmission frequency of the cell of the existing cellular radio network. This helps to maximize the received power from a site of the introduced cellular radio network at a location where the interference from the existing cellular radio network reaches a maximum value, i.e. at the center of the cell.

In accordance therewith, FIG. 13 shows a partition of an existing cellular radio network 1301, such as an existing cellular radio network as it was outlined with respect to previous embodiments.

Further, FIG. 13 shows an area obtained by connecting at least two cells of the existing cellular radio network using the same transmission frequency, in the present case represented by a triangle 1304 obtained by connecting three cells of the existing cellular radio networks using the transmission frequency 4.

In this case an optimum location for a cell cluster of the introduced cellular radio network using the transmission frequency 4 may, disregarding adjacent channel interference, in the center of the triangle 1304.

However, considering adjacent channel interference, i.e., an interference from cell cluster 1303 using transmission frequency 4 and the cell of the existing cellular radio network using the transmission frequency 3 (in the figure located underneath the cell cluster 1303), it may be advantageous to co-locate the cell cluster 1303 and the cell of the existing cellular radio network using the transmission frequency 3 at a location as shown in FIG. 13.

The shift of the cell cluster 1303 from the center of the triangle 1302, as indicated by arrow 1304, for co-locating the cell and the cell cluster using the adjacent transmission frequencies, may be determined to yield better effects in reducing the adjacent channel interference as compared to the shift into the opposite direction shown in FIG. 12, particularly if the distance between the center of the triangle 1302 and the center of the cell of the existing cellular radio network using the transmission frequency 3, i.e., the adjacent transmission frequency, is small.

Interference measurements may be employed in order to determine whether a shift direction towards co-locating the cell and the cell cluster allows a better reduction of the adjacent channel interference as compared to moving the cell cluster away from the cell using the adjacent transmission frequency, as outlined with respect to FIG. 12. The outcome of this evaluation of the shift direction may also depend on shifting further cell clusters of the introduced cellular radio network.

In a further example it is assumed that the transmission frequency used by both the cell cluster of the introduced cellular radio network and the at least two cells of the existing cellular radio network constitutes a first transmission frequency.

Further, it is assumed that a transmission frequency adjacent to the first transmission frequency constitutes a second transmission frequency.

In this case, the introduced cellular radio network may advantageously be arranged such that the center of a cell of the existing cellular radio network using the second transmission frequency is located at the center of a cell cluster of the introduced cellular radio network using the first transmission frequency.

Also, an apparatus may be provided, including mans adapted for locating the center of a cell of the existing cellular radio network using the second transmission frequency at the center of a cell of a cell cluster of the introduced cellular radio network using the first transmission frequency.

This may be achieved by either shifting the cell cluster of the introduced cellular radio network, as outlined above, or may be achieved by shifting the center of the cell of the existing cellular radio network using the second transmission frequency.

In the following, a further embodiment of the invention will be described with respect to FIG. 14.

Figure 14:
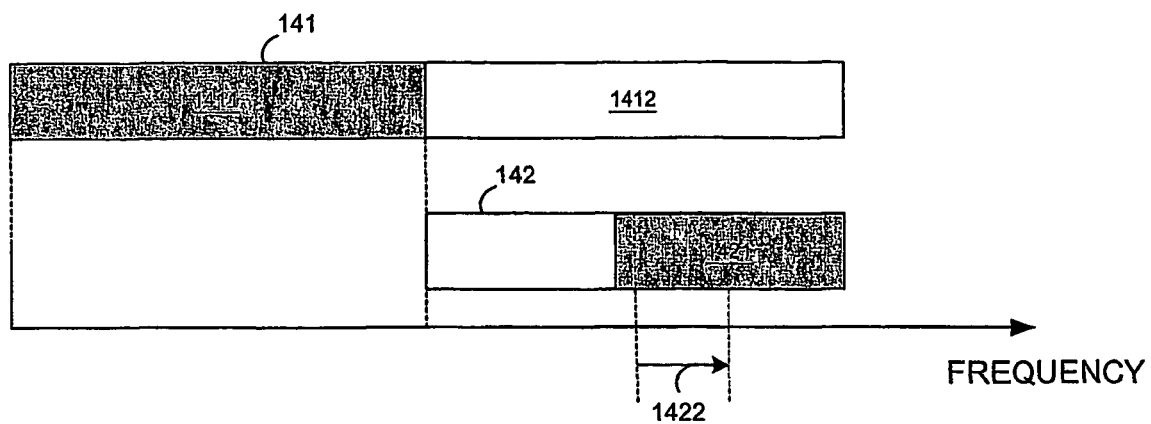
FIG. 14 illustrates steps for adjusting frequencies of a cellular radio network according to another embodiment of the invention.

FIG. 14 outlines a case, where adjacent channel interference is reduced by employing the fact that transmission frequencies used by respective cells or cell clusters are generally located in a somewhat wider frequency band, allowing to freely arrange the transmission frequency within the frequency band.

In this case, in order to reduce an adjacent channel interference, a transmission frequency may be appropriately arranged in the (somewhat wider) frequency band, at a location shifted within the frequency band further away from an adjacent transmission frequency band.

This case is further illustrated in FIG. 14. In FIG. 14, a first frequency band 141 of a first cellular radio network is shown, having two transmission frequencies 1411 and 1412. In FIG. 14, the horizontal direction denotes the frequency direction.

Further, a frequency band 142 is illustrated in FIG. 14, including a transmission frequency 1421 of a second cellular radio network.

The first cellular radio network may for example be constituted by an existing cellular radio network, as outlined above, or may be constituted by the introduced cellular radio network, also as outlined above. Vice versa, the second cellular radio network may be constituted by the respective other one of the existing cellular radio network and the introduced cellular radio network.

As illustrated in FIG. 14, the transmission frequency 1421 occupies a frequency range which is smaller than the frequency band 142 allocated for the second cellular radio network.

Consequently, the first transmission frequency 1411 in the transmission frequency band 141 of the first cellular radio network constitutes a transmission frequency adjacent to the transmission frequency 1421 of the transmission frequency band 142 of the second cellular radio network, as for example outlined in any of the further embodiments.

Consequently, in order to reduce the interference between the adjacent transmission frequencies 1411 and 1421, the transmission frequency 1421 may be displaced in frequency direction away from the frequencies occupied by the transmission frequency 1411.

This displacement is illustrated in FIG. 14 by an arrow 1422, illustrating the shift of the transmission frequency 1421 of the second cellular radio network from the center position of the transmission frequency 1421 in the frequency band 142.

In a further example it is assumed that a transmission frequency used by both a cell cluster of an introduced cellular radio network and at least two cells of an existing cellular radio network constitutes a first transmission frequency band.

Further, it is assumed that a transmission frequency band adjacent to the first transmission frequency band constitutes a second transmission frequency band.

The first and second transmission frequency band may, either one or both, cover a larger range of frequencies than the corresponding transmission frequency.

In this case, in order to reduce an adjacent channel interference, at least one of the transmission frequencies of the first and second transmission frequency band may be offset from the center of the respective frequency band in a frequency direction away from the respective other one of the first and second transmission frequency band.

Further, adjusting means may be provided to offset the at least one of the first and second transmission frequencies from the center of the corresponding frequency band in a frequency direction away from the respective other one of the first and second transmission frequencies.

Thus, one or both of the transmission frequencies of the first and second transmission frequency band may be shifted within the respective transmission frequency band, in order to increase the distance in frequency direction between the two transmission frequencies.

The approach described with respect to FIG. 14 may be applied individually, or may be used for arranging and adjusting cellular radio networks together with any of the examples of the embodiments described further above.

In the following a further embodiment of the invention will be described with respect to FIG. 15.

Figure 15:
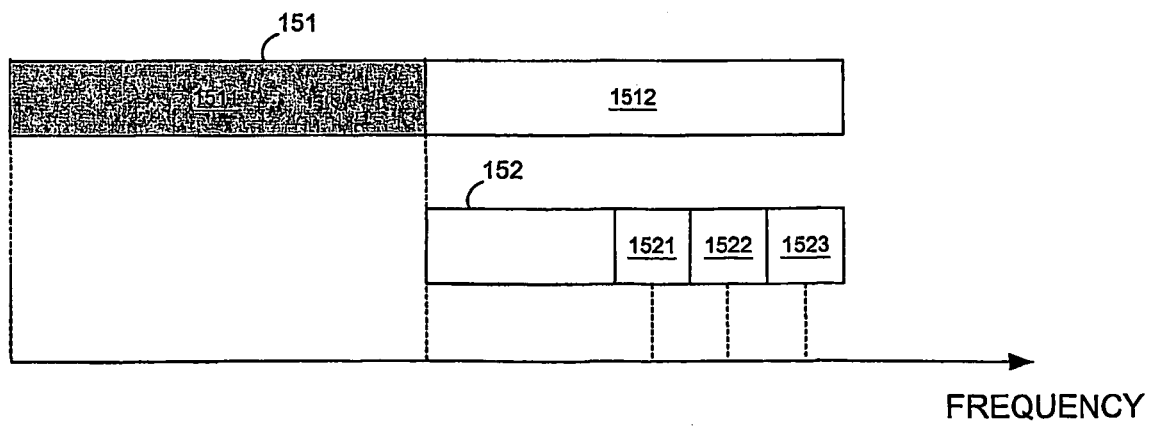
FIG. 15 illustrates steps for adjusting frequencies of a cellular radio network according to another embodiment of the invention.

FIG. 15 shows a further embodiment for reducing an adjacent channel interference between cells of an existing cellular radio network and cells of an introduced cellular radio network using adjacent transmission frequencies.

In FIG. 15, a transmission frequency band of a first cellular radio network is illustrated at reference numeral 151. The transmission frequency band includes a first transmission frequency 1511 and a second transmission frequency 1512 of the first cellular radio network. Further, FIG. 15 illustrates a frequency band 152 of a second cellular radio network, including three transmission frequencies 1521, 1522 and 1523. The transmission frequencies each occupy parts of the transmission frequency band 152 of the second cellular radio network.

As outlined with respect to FIG. 14, the first cellular radio network and the second cellular radio network may constitute either one of an existing cellular radio network and an introduced cellular radio network.

In the embodiment of FIG. 15, it is assumed that the frequency band 152 of the second cellular radio network covers a larger frequency range than the transmission frequencies 1521, 1522 and 1523 together.

In the example of FIG. 15, the transmission frequencies 1521, 1522, 1523 are located such that a distance between the channels and the adjacent transmission frequency, i.e. the transmission frequency 1511 of the first cellular radio network is maximized. In other words, the transmission frequencies of the transmission frequency band 152 of the second cellular radio network are shifted in the frequency direction increasing a frequency distance between the transmission frequency 1511 and the transmission frequencies 1521, 1522 and 1523.

Further, if it is assumed that the frequency band 152 is subdivided into a number of transmission frequencies larger than 3, that the second cellular radio network may be arranged to not use such transmission frequencies of the frequency band 152, which are located close to the adjacent transmission frequency 1511 of the first cellular radio network, and would be subject to increased interference.

In a further example it is assumed that the transmission frequency used by both the cell cluster of an introduced cellular radio network and at least two cells of an existing cellular radio network constitutes a first transmission frequency band.

Further, it is assumed that an adjacent frequency band is provided, located adjacent to the first transmission frequency band, the adjacent frequency band including a plurality of second transmission frequencies.

In this case, the cell clusters of the introduced cellular radio network and/or at least two cells of the existing cellular radio network may be arranged to not use at least one of the plurality of second transmission frequencies being located closest to the first transmission frequency band.

Also, an apparatus may be provided, including adjusting means adapted for instructing the cell clusters of the introduced cellular radio network and/or the at least two cells of the existing cellular radio network to not use at least one of the plurality of second transmission frequencies being located closest to the first transmission frequency band.

Further, if it is assumed that also the first transmission frequency 1511 of FIG. 15 is subdivided into a plurality of sub frequencies, the above approach may be applied to both cellular radio networks.

Again, while the embodiment of FIG. 15 has been described as a stand-alone approach to reduce adjacent channel interference, it may be used in conjunction with one or more of the embodiments outlined before.

In the following, a further embodiment of the invention will be described with respect to FIG. 16.

In the previous embodiments, possible locations for individual cell clusters of the introduced cellular radio network regarding the cell sites of the existing cellular radio network were disclosed. FIG. 16 shows an embodiment of the invention illustrating preferred locations and shapes of cell clusters of a cellular radio network introduced into an existing cellular radio network.

Figure 16:
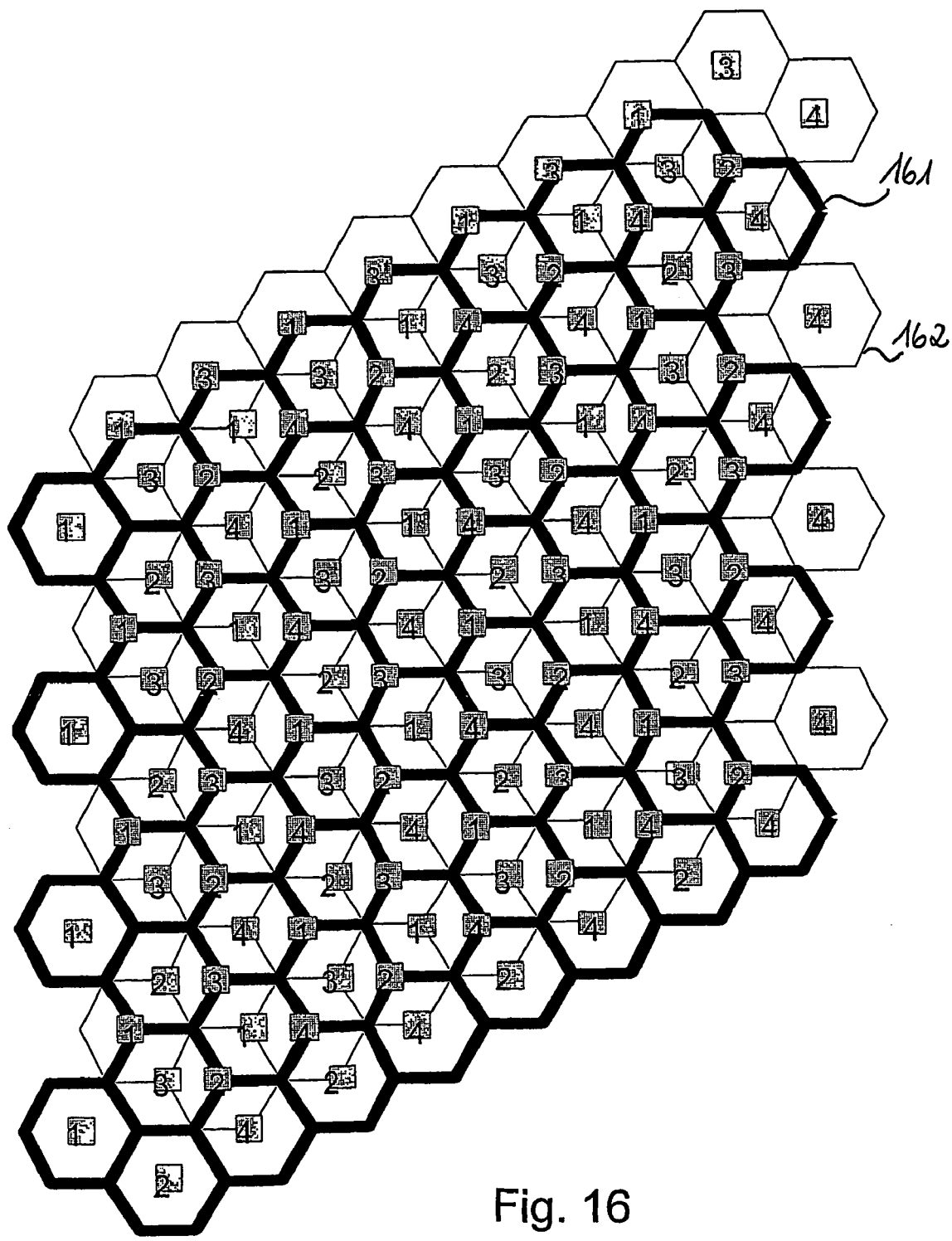
FIG. 16 shows an embodiment of the invention illustrating preferred locations and shapes of cell clusters of an introduced cellular radio network.

In FIG. 16 an example is given for a pattern of locations and shapes of cell clusters of the introduced cellular radio network. Here, the pattern forms a network covering the geographical area with cell clusters without "holes", i.e. providing full coverage of a given geographical area.

FIG. 16 shows an example of the shapes and the pattern of locations of cells of second cellular radio network. In this figure, the cells 161 of the existing cellular radio network are depicted as hexagons with thick solid lines. The number in the center of each hexagon indicates the frequency used by the cell represented by the hexagon. The existing cellular radio network has a frequency reuse factor of 4.

Cell clusters 162 of the introduced cellular radio network are depicted as hexagons with dashed and solid thin edges. Each dashed or solid line section forms an edge of two adjacent cell clusters. The number in the center of each of these hexagons indicates the frequency used by the cell cluster represented by the hexagon.

In this solution, the cell clusters of the introduced cellular radio network have the same shape and orientation as the cells of the existing cellular radio network. The centers of the cell clusters of a given frequency are arranged close to a location determined by the center of the equilateral triangle of three closest cells using this frequency, similar to what was outlined with respect to previous embodiments. It is noted that cell clusters of the frequency are located close to only every second such triangle.

The pattern of allocating frequencies to cell clusters of the introduced cellular radio network is the same as for allocating frequencies to the existing cellular radio network.

While in FIG. 16 a specific example of frequency plans and reuse factors of the introduced cellular radio network and the existing cellular radio network are shown, it is understood that any other frequency plan and reuse factor can be employed, as long as the above principles are followed.

In the following, a further embodiment of the invention will be described with respect to FIG. 17.

Figure 17:
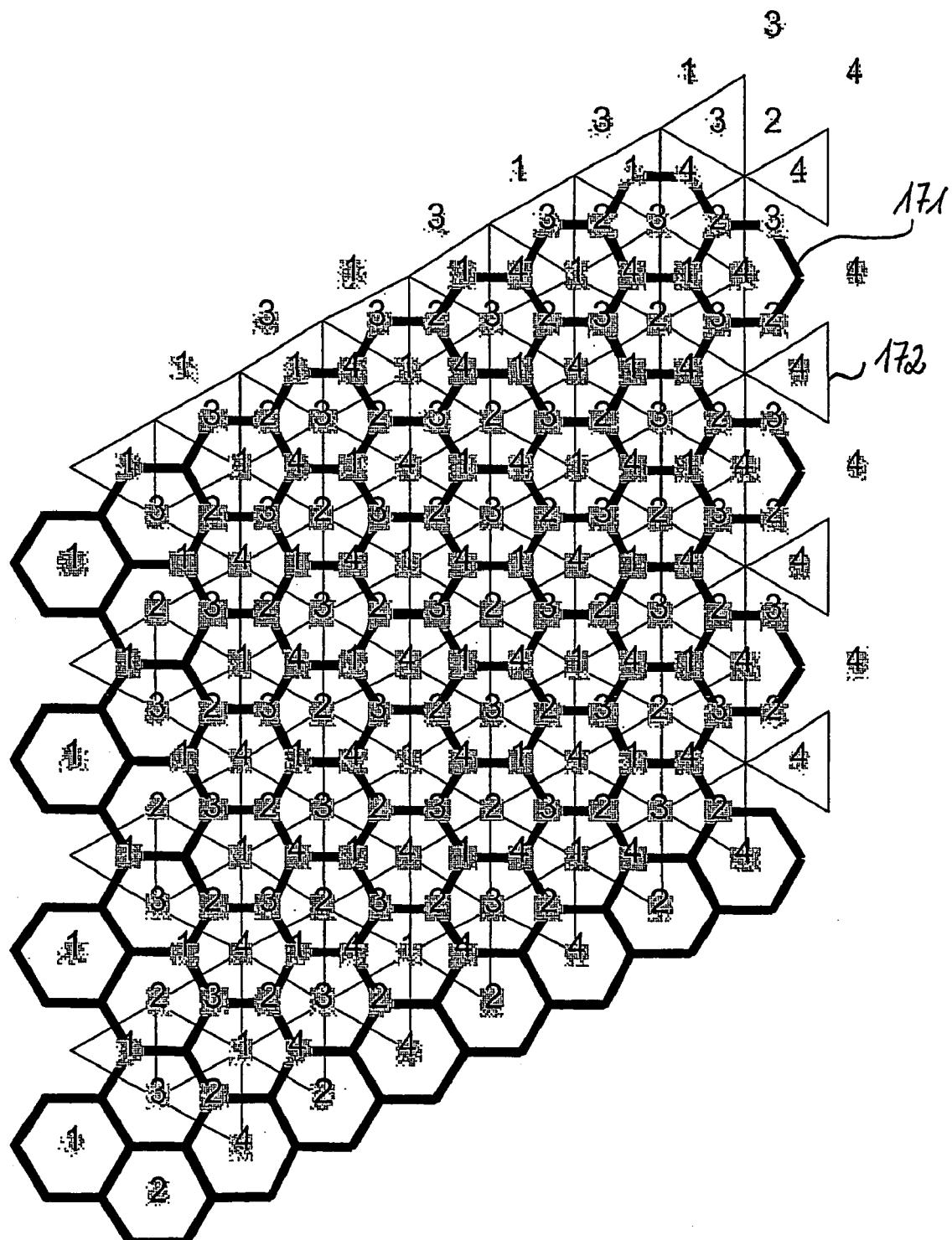
FIG. 17 shows an embodiment of the invention illustrating preferred locations and shapes of cell clusters of an introduced cellular radio network.

FIG. 17 shows another embodiment of the invention illustrating preferred locations and shapes of cell clusters of a cellular radio network introduced into an existing cellular radio network.

The shapes and locations of cell clusters described with respect to FIG. 16 do not everywhere or always maximise the smallest distance between locations in cells of the existing cellular radio network using a given frequency and location in the closest cell cluster of the introduced cellular radio network using the same frequency. In the example of FIG. 16, this may pose a problem, because it causes the corners of cell clusters using a given frequency to touch the corners of cells of the existing cellular radio network using the same frequency. According to the present embodiment of FIG. 17, the mutual interference between the existing cellular radio network and the introduced cellular radio network in the area around the above touching point is further reduced.

The shapes and patterns of locations of cell clusters of the introduced cellular radio network proposed in FIG. 17 overcome this problem. In this embodiments, the cells of the existing cellular radio network are again depicted as hexagons with thick solid lines and denoted by a reference numeral 171. The number in the center of each hexagon indicates the frequency used by the cell represented by the corresponding hexagon. A frequency reuse factor of 4 is applied in FIG. 17.

Cell clusters of the introduced cellular radio network are denoted 172 and depicted as equilateral triangles with dashed and solid thin edges. Each thin line section forms an edge of two adjacent cell clusters. The number in the center of each of these triangles indicates the frequency used by the cell cluster represented by the triangle.

In the embodiment of FIG. 17, the cell cluster locations of the cell clusters of the embodiment described with respect to FIG. 16 are kept. However, according to the present embodiment, additional cell clusters are introduced. These further introduced cell clusters have their centers close to the centers of those equilateral triangles of the embodiment of FIG. 16, that do not already have close to their center a cell cluster of the introduced cellular radio network. As outlined above, the cells forming the triangles and the respective cell cluster use the same frequency. Now each, as opposed to every second, equilateral triangle formed of cell centers of the existing cellular radio network with the same frequency has close to its center a cell cluster center of the introduced cellular radio network, the cell cluster and the cells using the same frequency, as outlined above.

The shapes of the cell clusters are equilateral triangles with a edge length equal to the edge length of the cells of the existing cellular radio network. The orientation of the cell clusters is equivalent to the by 180 degree rotated orientation of the equilateral triangle made up of the three cells of the existing cellular radio network using the same frequency as and closest to the cell cluster. The area size of each triangular cell cluster of the introduced cellular radio network in FIG. 17 is half the size of the area of each hexagon cell cluster of the introduced cellular radio network in FIG. 16, under the condition that the edges length of all hexagons and all triangles are all the same in both figures.

While in FIG. 17 a specific example of frequency plans and reuse factor of the introduced cellular radio network and the existing cellular radio network are shown, it is understood that any other frequency plan and reuse factor can be employed, as long as the above principles are followed, including introducing cell clusters into each equilateral triangle as formed above.

It is further noted that the invention described in the above embodiments or individual aspects thereof may be utilized in various ways. For example, the invention may be employed in a maintenance tool to dynamically adjust a cellular radio network during operation and a simulation tool to determine in advance, i.e. before implementing a change to a cellular radio network, effects of changes of parameters such as transmission power of an introduced cellular radio network, e.g., based on conditions such as subscriber density and terrain characteristics. Further, the invention may also be used in a network planning tool to design a cellular radio network to be introduced into an existing cellular radio network.

Further, the functions of the embodiments of the invention may be realized by at least one computer program to be executed on a data processing device or a network of data processing devices. The at least one computer program may be stored on at least one computer readable medium, which may be a magnetic or optical or other tangible medium on which a program is recorded, but can also be a signal, e.g. analog or digital, electromagnetic or optical, in which the program is embodied for transmission.

The invention claimed is:

1. Apparatus for adjusting cell parameters of cells of a plurality of cell clusters of an introduced cellular radio network using a first frequency range, each cell cluster including at least one cell, the introduced cellular radio network being arranged in a geographical area served by an existing cellular radio network, the existing cellular radio network using a second frequency range at least overlapping the first frequency range, comprising
   interference determining means for receiving a value indicating an interference from the introduced cellular radio network to the existing cellular radio network; and
   adjusting means for adjusting the size of at least one cell of at least one cell cluster of the introduced cellular radio network and for adjusting the number of cells of the at least one cell cluster in dependence on the measured interference from the introduced cellular radio network to the existing cellular radio network.

2. Apparatus according to claim 1, wherein the adjusting means is adapted to reduce the size of at least one cell of at least one cell cluster of the introduced cellular radio network and to introduce at least one cell into the at least one cell cluster, in case the measured interference from the introduced cellular radio network to the existing cellular radio network is larger than a first predetermined threshold; and the adjusting means is adapted to increase the size of at least one cell of at least one cell cluster of the introduced cellular radio network and for removing at least one cell from the at least one cell cluster, in case the measured interference from the introduced cellular radio network to the existing cellular radio network is smaller than a second predetermined threshold.

3. Apparatus of claim 1, wherein the interference determining means is adapted to receive values indicating the interference from the introduced cellular radio network to the existing cellular radio network at a plurality of measurement locations, and the adjusting means is adapted to determine at least one cell cluster causing the measured interference at each measurement location and to adjust the determined cell clusters in accordance with the measured interference.

4. Apparatus of claim 1, including
interference determining means for receving a value indicating an interference from the existing cellular radio network to the introduced cellular radio network; and
wherein the adjusting means is adapted to reduce the size of at least one cell of at least one cell cluster of the introduced cellular radio network and to introduce new cells into the at least one cell cluster, in case the measured interference from the existing cellular radio network to the introduced cellular radio network is larger than a third predetermined threshold.

5. Apparatus of claim 1, wherein the adjusting means is adapted to increase the size of at least one cell of at least one cell clusters and to remove at least one cell from at least one cell cluster of the introduced cellular radio network, in case the measured interference from the existing cellular radio network to the introduced cellular radio network is smaller than a fourth predetermined threshold.

6. Apparatus of claim 1, wherein the center of each cell cluster being located in an area defined by connecting at least two cells of the existing cellular radio network arranged to use the same transmission frequency, the cell clusters of the introduced cellular radio network are arranged such that they do not overlap with cells of the existing cellular radio network which are arranged to use the same transmission frequency as the cell cluster and both the cell cluster of the introduced cellular radio network and the at least two cells of the existing cellular radio network are arranged to use the same transmission frequency.

7. Apparatus of claim 1, wherein the area is defined by the smallest triangle connecting the centers of three cells of the existing cellular radio network, the three cells being arranged to use the same transmission frequency.

8. Apparatus of claim 1, including
a first cluster arranged to use a first set of transmission frequencies;
a second cluster located adjacent to the first cluster and arranged to use a second set of transmission frequencies; and
wherein the cells at the periphery of the first cluster are arranged to use at least one transmission frequency of the second set of transmission frequencies and the cells at the periphery of the second cluster are arranged to use at least one transmission frequency of the first set of transmission frequencies and wherein adjacent cells use at least one identical transmission frequency.

9. Apparatus of claim 1, wherein
the transmission frequency used by both the cell cluster of the introduced cellular radio network and the at least two cells of the existing cellular radio network constitutes a first transmission frequency;
a transmission frequency adjacent to the first transmission frequency constitutes a second transmission frequency; and
wherein the adjusting means is adapted for adjusting a frequency plan used by the existing cellular radio network such that at least one cell of the existing cellular radio network using the second transmission frequency is located at or close to the center of a second area defined by connecting at least two cells of the existing cellular radio network using the first transmission frequency, the first and second area being different from each other.

10. Apparatus of claim 1, wherein
the transmission frequency used by both the cell cluster of the introduced cellular radio network and the at least two cells of the existing cellular radio network constitutes a first transmission frequency;
a transmission frequency adjacent to the first transmission frequency constitutes a second transmission frequency; and
wherein the adjusting means is adapted for adjusting a frequency plan used by the existing cellular radio network such that at least one cell of the existing cellular radio network using the second transmission frequency is dislocated from the center of the first area.

11. Apparatus of claim 1, wherein
the transmission frequency used by both the cell cluster of the introduced cellular radio network and the at least two cells of the existing cellular radio network constitutes a first transmission frequency;
a transmission frequency adjacent to the first transmission frequency constitutes a second transmission frequency; and
wherein the adjusting means is adapted for dislocating the center of a cell cluster of the introduced cellular radio network using the first transmission frequency from the center of the first area in a direction increasing the distance from the cell cluster to the cells of the existing cellular radio network using the second transmission frequency.

12. Apparatus of claim 1, wherein
the transmission frequency used by both the cell cluster of the introduced cellular radio network and the at least two cells of the existing cellular radio network constitutes a first transmission frequency;
a transmission frequency adjacent to the first transmission frequency constitutes a second transmission frequency; and
wherein the adjusting means is adapted for locating the center of a cell of the existing cellular radio network using the second transmission frequency at the center of a cell of a cell cluster of the introduced cellular radio network using the first transmission frequency.

13. Apparatus of claim 1, wherein
the transmission frequency used by both the cell cluster of the introduced cellular radio network and the at least two cells of the existing cellular radio network constitutes a first transmission frequency within a first frequency band;
a transmission frequency adjacent to the first transmission frequency constitutes a second transmission frequency within a second frequency band; and
wherein the adjusting means is adapted to offset the at least one of the first and second transmission frequencies from the center of the corresponding frequency band in a frequency direction away from the respective other one of the first and second transmission frequencies.

14. Apparatus of claim 1, wherein
the transmission frequency used by both the cell cluster of the introduced cellular radio network and the at least two cells of the existing cellular radio network constitutes a first transmission frequency band;
an adjacent frequency band is provided, located adjacent to the first transmission frequency band, the adjacent frequency band including a plurality of second transmission frequencies; and
wherein the adjusting means is adapted for instructing the cell clusters of the introduced cellular radio network and/or the at least two cells of the existing cellular radio network to not use at least one of the plurality of second transmission frequencies being located closest to the first transmission frequency band.

15. Method of adjusting cell parameters of cells of a plurality of cell clusters of a introduced cellular radio network using a first frequency range, each cell cluster including at least one cell, the introduced cellular radio network being arranged in a geographical area served by an existing cellular radio network, the existing cellular radio network using a second frequency range at least overlapping the first frequency range, comprising
receiving a value indicating an interference from the introduced cellular radio network to the existing cellular radio network; and
adjusting the size of at least one cell of at least one cell cluster of the introduced cellular radio network and adjusting the number of cells of the at least one cell cluster depending on the measured interference from the introduced cellular radio network to the existing cellular radio network.

16. Method of adjusting cell parameters of claim 15, including
reducing the size of at least one cell of at least one cell cluster of the introduced cellular radio network and introducing at least one new cell into the at least one cell cluster, in case the measured interference from the introduced cellular radio network to the existing cellular radio network is larger than a first predetermined threshold; and
increasing the size of at least one cell of at least one cell cluster of the introduced cellular radio network and removing at least one cell from the at least one cell cluster, in case the measured interference from the introduced cellular radio network to the existing cellular radio network is smaller than a second predetermined threshold.

17. Method of adjusting cell parameters of claim 15, including
receiving values indicating an interference from the introduced cellular radio network to the existing cellular radio network at a plurality of measurement locations, determining the cell clusters causing the measured interference at each measurement location, and adjusting the determined cell clusters in accordance with the measured interference.

18. Method of adjusting cell parameters of claim 15, including
receiving a value indicating an interference from the existing cellular radio network to the introduced cellular radio network; and
reducing the size of at least one cell of at least one cell cluster of the introduced cellular radio network and introducing at least one new cell into the at least one cell cluster, in case the measured interference from the existing cellular radio network to the introduced cellular radio network is larger than a third predetermined threshold.

19. Method of adjusting cell parameters of claim 15, increasing the size of at least one cell of at least one cell cluster of the introduced cellular radio network and removing at least one cell from the at least one cell cluster, in case the measured interference from the existing cellular radio network to the introduced cellular radio network is smaller than a fourth predetermined threshold.

20. Method of adjusting cell parameters of claim 15, including locating the center of each cell cluster in an area defined by connecting at least two cells of the existing cellular radio network using the same transmission frequency, such that they do not overlap with cells of the existing cellular radio network which are arranged to use the same transmission frequency as the cell cluster and both the cell cluster of the introduced cellular radio network.

21. Method of adjusting cell parameters of claim 15, including defining the smallest triangle connecting the centers of three cells of the existing cellular radio network, the three cells using the same transmission frequency.

22. Method of adjusting cell parameters of claim 15, including
arranging a first cluster use a first set of transmission frequencies;
arranging a second cluster located adjacent to the first cluster to use a second set of transmission frequencies; and
arranging the cells at the periphery of the first cluster to use at least one transmission frequency of the second set of transmission frequencies and arranging the cells at the periphery of the second cluster to use at least one transmission frequency of the first set of transmission frequencies and wherein adjacent cells use at least one identical transmission frequency.

23. A computer program provided in accordance with the method of claim 15.

24. A computer readable medium, having recorded thereon the program according to claim 23.

25. A computer program product comprising the computer readable medium according to claim 24.

* * * * *